(12) United States Patent
Zhao et al.

(10) Patent No.: US 12,348,749 B2
(45) Date of Patent: Jul. 1, 2025

(54) EXTENSION TO BLOCK ADAPTIVE WEIGHTED PREDICTION

(71) Applicant: Tencent America LLC, Palo Alto, CA (US)

(72) Inventors: Liang Zhao, Sunnyvale, CA (US); Xin Zhao, San Jose, CA (US); Jing Ye, San Jose, CA (US); Han Gao, San Diego, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 107 days.

(21) Appl. No.: 18/464,540

(22) Filed: Sep. 11, 2023

(65) Prior Publication Data

US 2024/0380894 A1 Nov. 14, 2024

Related U.S. Application Data

(60) Provisional application No. 63/464,776, filed on May 8, 2023.

(51) Int. Cl.
*H04N 19/44* (2014.01)
*H04N 19/105* (2014.01)
(Continued)

(52) U.S. Cl.
CPC .......... *H04N 19/44* (2014.11); *H04N 19/105* (2014.11); *H04N 19/139* (2014.11);
(Continued)

(58) Field of Classification Search
CPC .. H04N 19/105; H04N 19/139; H04N 19/176; H04N 19/30; H04N 19/44;
(Continued)

(56) References Cited

U.S. PATENT DOCUMENTS

| 6,212,235 | B1 | 4/2001 | Nieweglowski et al. |
| 2019/0313130 | A1 | 10/2019 | Zhang et al. |
| 2022/0007034 | A1 | 1/2022 | Wang et al. |
| 2022/0046274 | A1 | 2/2022 | Esenlik et al. |
| 2022/0086479 | A1 | 3/2022 | Lim et al. |
| 2022/0124340 | A1 | 4/2022 | Deng et al. |

(Continued)

FOREIGN PATENT DOCUMENTS

WO   WO 2021/222871 A1   11/2021

OTHER PUBLICATIONS

PCT International Search Report and Written Opinion regarding PCT/US23/32698 dated Dec. 18, 2023, 14 pages.

(Continued)

*Primary Examiner* — Anner N Holder
(74) *Attorney, Agent, or Firm* — Crowell & Moring LLP

(57) ABSTRACT

This disclosure relates generally to video coding/decoding and particularly for providing extension to block adaptive weighted prediction (BAWP) with multiple motion vectors. One method includes receiving a coded video bitstream; identifying, from the coded video bitstream, a first motion vector corresponding to a first reference block and a second motion vector corresponding to a second reference block; obtaining a first scaling factor corresponding to the first motion vector and a second scaling factor corresponding to the second motion vector by parsing the coded video bitstream; generating a first predicted block based on the first scaling factor and the first reference block according to a first linear equation; generating a second predicted block based on the second reference block according to a second linear equation; and reconstructing the current block based on the first predicted block and the second predicted block.

20 Claims, 13 Drawing Sheets

(51) Int. Cl.
| | |
|---|---|
| *H04N 19/139* | (2014.01) |
| *H04N 19/176* | (2014.01) |
| *H04N 19/30* | (2014.01) |
| *H04N 19/46* | (2014.01) |
| *H04N 19/70* | (2014.01) |

(52) U.S. Cl.
CPC ........... *H04N 19/176* (2014.11); *H04N 19/30* (2014.11); *H04N 19/46* (2014.11); *H04N 19/70* (2014.11)

(58) Field of Classification Search
CPC ...... H04N 19/46; H04N 19/52; H04N 19/593; H04N 19/70
See application file for complete search history.

(56) References Cited

U.S. PATENT DOCUMENTS

| | | | | |
|---|---|---|---|---|
| 2022/0311997 | A1* | 9/2022 | Huang | H04N 19/159 |
| 2022/0400272 | A1 | 12/2022 | Lin et al. | |
| 2023/0328249 | A1* | 10/2023 | Li | H04N 19/105 375/240.02 |

OTHER PUBLICATIONS

PCT International Search Report and Written Opinion regarding PCT/US23/32697 dated Jan. 2, 2024, 6 pages.

Xiu et al., "EE2-Test2.7: Improvements on local illumination compensation," Document: JVET-AD0213-v1, Joint Video Experts Team (JVET) of ITU-T SG 16 WP 3 and ISO/IEC JTC 1/SC 29, 30th Meeting, Antalya, TR, Apr. 21-28, 2023, 4 pages.

Lu et al, "Optical Flow Motion Vector Refinement for AV2," Alliance for Open Media, Codec Working Group, Document: CWG-B041_v3, Google, Sep. 20, 2021, 11 pages.

Zhao et al., "Tool Description for AV1 and libaom," Alliance for Open Media, Codec Working Group, Document: CWG-B078_v1, Tencent, Google, Netflix, Oct. 4, 2021, 41 pages.

Zhao et al., "Advanced motion vector difference coding," Alliance for Open Media, Codec Working Group, Document: CWG-B092, Tencent, Nov. 24, 2021, 7 pages.

Zhao et al., "Improved adaptive MVD resolution," Alliance for Open Media, Codec Working Group, Document: CWG-C011, Feb. 9, 2022, 7 pages.

Bross et al., "Versatile Video Coding Editorial Refinements on Draft 10," Output document approved by JVET, Joint Video Experts Team (JVET) of ITU-T SG 16 WP 3 and ISO/IEC JTC 1/SC 29, 20th Meeting, by teleconference, Oct. 7-17, 2020, Document: JVET-T2001-v2, 512 pages.

Y. Chen, et al, "An overview of core coding tools in the AV1 video codec," IEEE Picture Coding Symposium, San Francisco, CA, USA, Jun. 2018, 5 pages.

De Rivaz et al., "AV1 Bitstream & Decoding Process Specification," Jan. 8, 2019.

Karpilovsky et al., "Proposal: New Inter Modes for AV2," Alliance for Open Media, Codec Working Group, Document: CWG-B018_v1, Google, Feb. 24, 2021, 6 pages.

\* cited by examiner

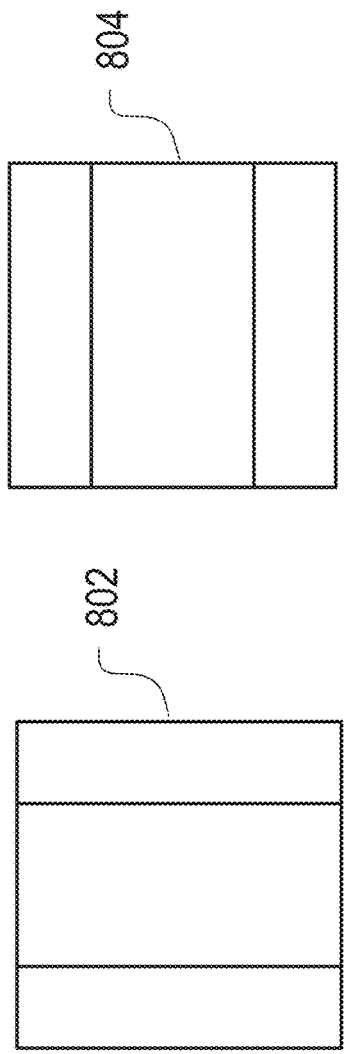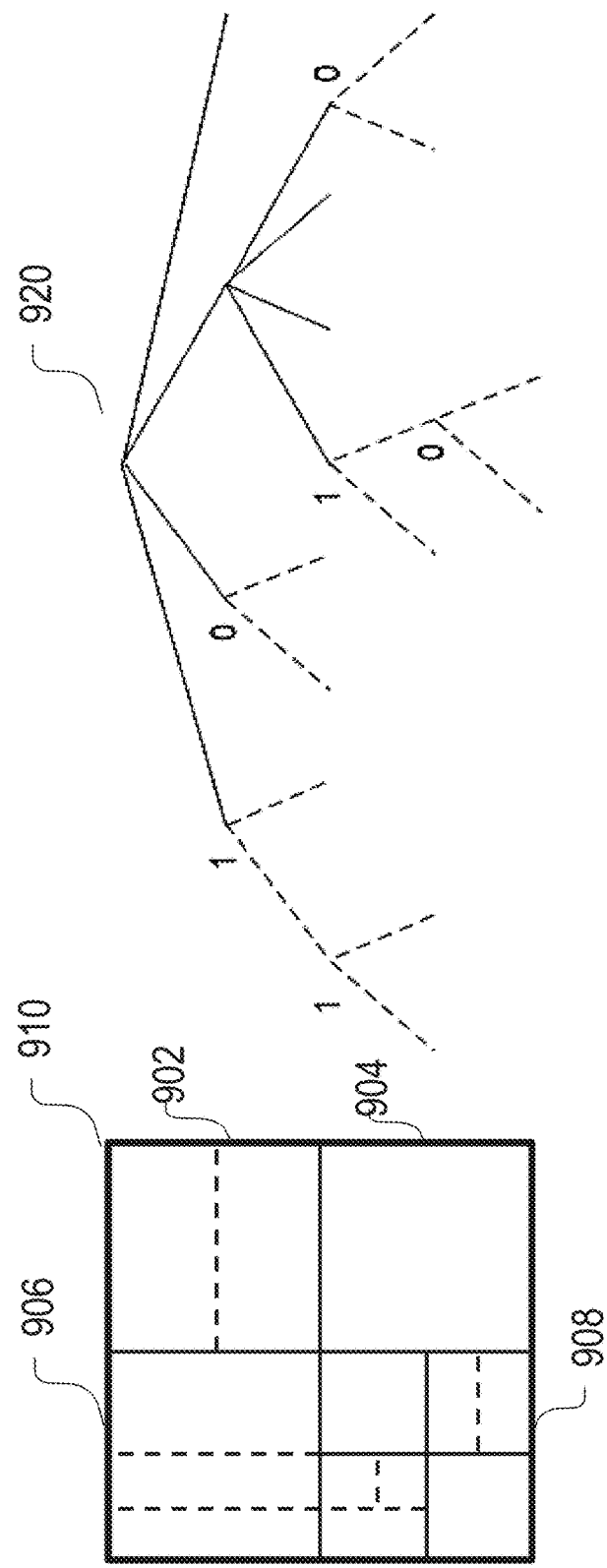
FIG. 8
FIG. 9

EXTENSION TO BLOCK ADAPTIVE WEIGHTED PREDICTION

INCORPORATION BY REFERENCE

This application is based on and claims the benefit of priority to U.S. Provisional Application No. 63/464,776, filed on May 8, 2023, which is herein incorporated by reference in its entirety.

TECHNICAL FIELD

This disclosure describes a set of advanced video/streaming coding/decoding technologies. More specifically, the disclosed technology involves extension to block adaptive weighted prediction (BAWP) to compensate local illumination variation.

BACKGROUND

Uncompressed digital video can include a series of pictures, and may specific bitrate requirements for storage, data processing, and for transmission bandwidth in streaming applications. One purpose of video coding and decoding can be the reduction of redundancy in the uncompressed input video signal, through various compression techniques.

SUMMARY

The present disclosure describes various embodiments of methods, apparatus, and computer-readable storage medium for extension to block adaptive weighted prediction (BAWP) with multiple motion vectors.

According to one aspect, an embodiment of the present disclosure provides a method for decoding a current block of a current frame in a coded video bitstream. The method includes receiving, by a device, a coded video bitstream. The device includes a memory storing instructions and a processor in communication with the memory. The method also includes identifying, by the device from the coded video bitstream, a first motion vector corresponding to a first reference block and a second motion vector corresponding to a second reference block associated with the current block of the current frame; obtaining, by the device, a first scaling factor corresponding to the first motion vector and a second scaling factor corresponding to the second motion vector by parsing the coded video bitstream; generating, by the device, a first predicted block based on the first scaling factor and the first reference block according to a first linear equation, the first linear equation being associated with the first scaling factor and a first offset; generating, by the device, a second predicted block based on the second reference block according to a second linear equation, the second linear equation being associated with the second scaling factor and a second offset; and reconstructing, by the device, the current block based on the first predicted block and the second predicted block.

According to another aspect, an embodiment of the present disclosure provides an apparatus for processing a current block of a current frame in a coded video bitstream. The apparatus includes a memory storing instructions; and a processor in communication with the memory. When the processor executes the instructions, the processor is configured to cause the apparatus to perform the above methods for video decoding and/or encoding.

In another aspect, an embodiment of the present disclosure provides non-transitory computer-readable mediums storing instructions which when executed by a computer for video decoding and/or encoding cause the computer to perform the above methods for video decoding and/or encoding.

The above and other aspects and their implementations are described in greater detail in the drawings, the descriptions, and the claims.

BRIEF DESCRIPTION OF THE DRAWINGS

Further features, the nature, and various advantages of the disclosed subject matter will be more apparent from the following detailed description and the accompanying drawings in which:

FIG. 8 shows another scheme of coding block partitioning according to example embodiments of the disclosure;

FIG. 9 shows another scheme of coding block partitioning according to example embodiments of the disclosure;

DETAILED DESCRIPTION OF EMBODIMENTS

The invention will now be described in detail hereinafter with reference to the accompanied drawings, which form a part of the present invention, and which show, by way of illustration, specific examples of embodiments. Please note that the invention may, however, be embodied in a variety of different forms and, therefore, the covered or claimed subject matter is intended to be construed as not being limited to any of the embodiments to be set forth below. Please also note that the invention may be embodied as methods, devices, components, or systems. Accordingly, embodiments of the invention may, for example, take the form of hardware, software, firmware or any combination thereof.

Throughout the specification and claims, terms may have nuanced meanings suggested or implied in context beyond an explicitly stated meaning. The phrase "in one embodiment" or "in some embodiments" as used herein does not necessarily refer to the same embodiment and the phrase "in another embodiment" or "in other embodiments" as used herein does not necessarily refer to a different embodiment. Likewise, the phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments/implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

Figure 1:
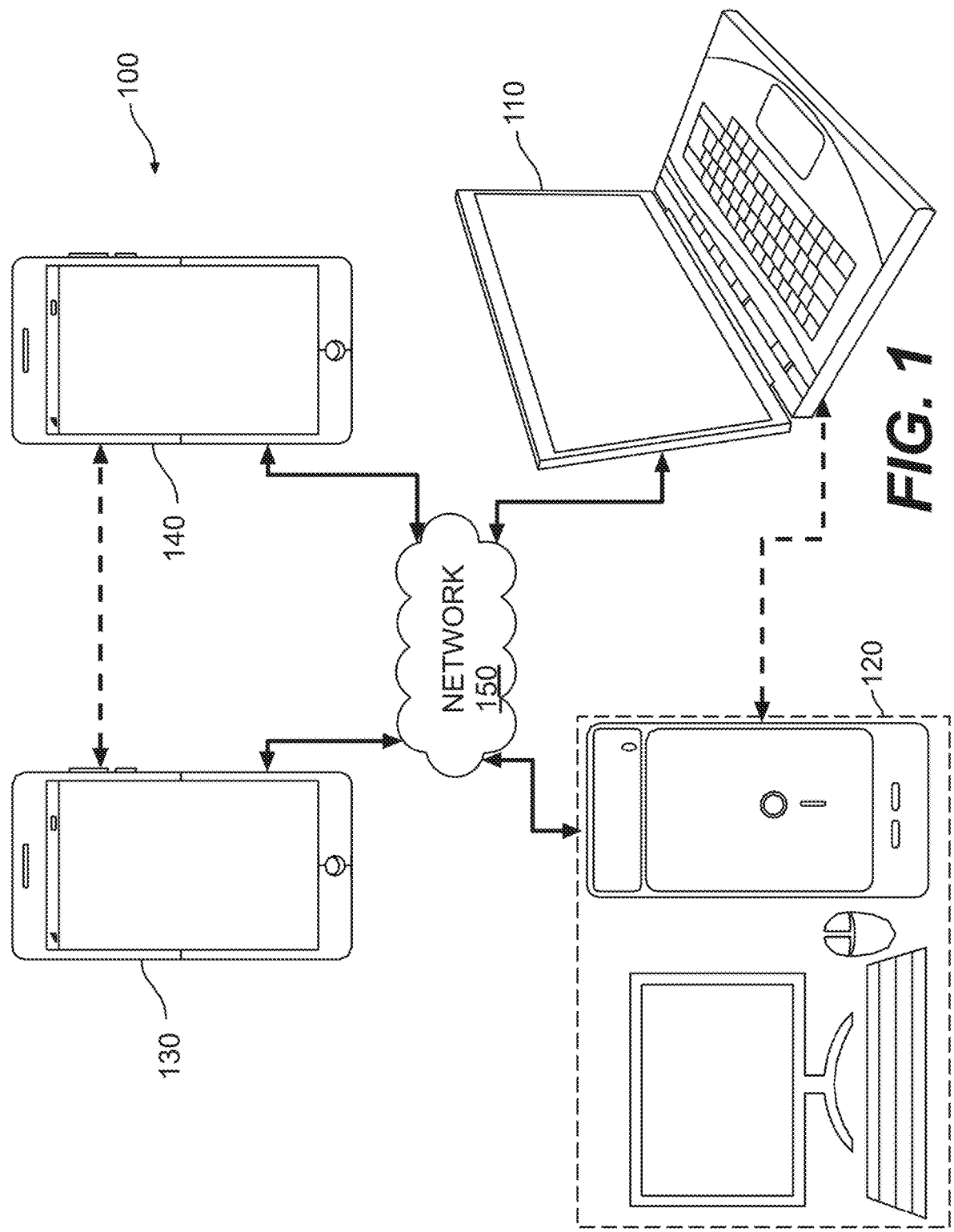
FIG. 1 shows a schematic illustration of a simplified block diagram of a communication system (100) in accordance with an example embodiment.

As shown in FIG. 1, terminal devices may be implemented as servers, personal computers and smart phones but the applicability of the underlying principles of the present disclosure may not be so limited. Embodiments of the present disclosure may be implemented in desktop computers, laptop computers, tablet computers, media players, wearable computers, dedicated video conferencing equipment, and/or the like. The network (150) represents any number or types of networks that convey coded video data among the terminal devices, including for example wireline (wired) and/or wireless communication networks. The communication network (150) may exchange data in circuit-switched, packet-switched, and/or other types of channels. Representative networks include telecommunications networks, local area networks, wide area networks and/or the Internet.

Figure 2:
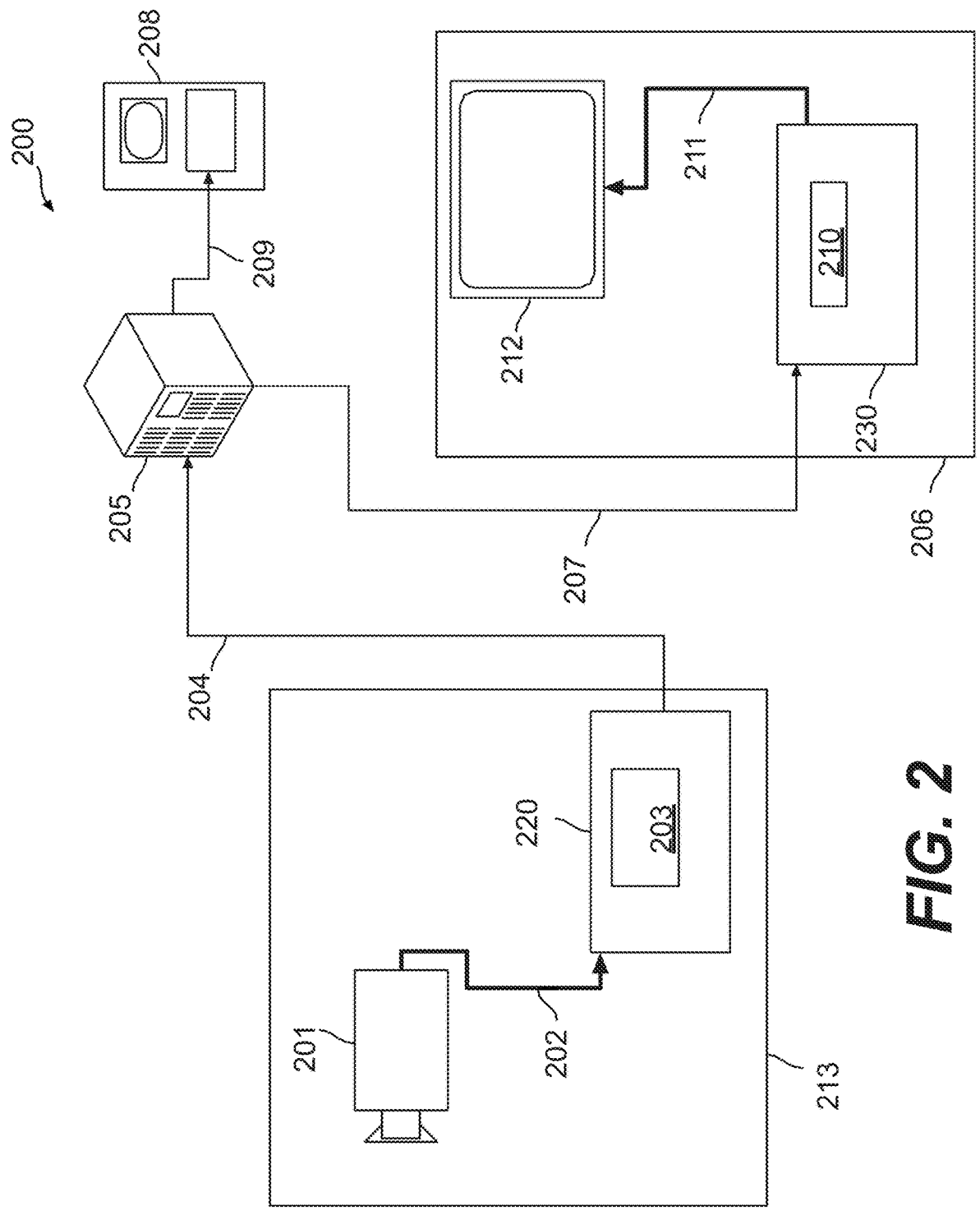
FIG. 2 shows a schematic illustration of a simplified block diagram of a communication system (200) in accordance with an example embodiment.

FIG. 2 illustrates, as an example for an application for the disclosed subject matter, a placement of a video encoder and a video decoder in a video streaming environment. The disclosed subject matter may be equally applicable to other video applications, including, for example, video conferencing, digital TV broadcasting, gaming, virtual reality, storage of compressed video on digital media including CD, DVD, memory stick and the like, and so on.

As shown in FIG. 2, a video streaming system may include a video capture subsystem (213) that can include a video source (201), e.g., a digital camera, for creating a stream of video pictures or images (202) that are uncompressed. In an example, the stream of video pictures (202) includes samples that are recorded by a digital camera of the video source (201). The stream of video pictures (202), depicted as a bold line to emphasize a high data volume when compared to encoded video data (204) (or coded video bitstreams), can be processed by an electronic device (220) that includes a video encoder (203) coupled to the video source (201). The video encoder (203) can include hardware, software, or a combination thereof to enable or implement aspects of the disclosed subject matter as described in more detail below. The encoded video data (204) (or encoded video bitstream (204)), depicted as a thin line to emphasize a lower data volume when compared to the stream of uncompressed video pictures (202), can be stored on a streaming server (205) for future use or directly to downstream video devices (not shown). One or more streaming client subsystems, such as client subsystems (206) and (208) in FIG. 2 can access the streaming server (205) to retrieve copies (207) and (209) of the encoded video data (204). A client subsystem (206) can include a video decoder (210), for example, in an electronic device (230). The video decoder (210) decodes the incoming copy (207) of the encoded video data and creates an outgoing stream of video pictures (211) that are uncompressed and that can be rendered on a display (212) (e.g., a display screen) or other rendering devices (not depicted).

Figure 3:
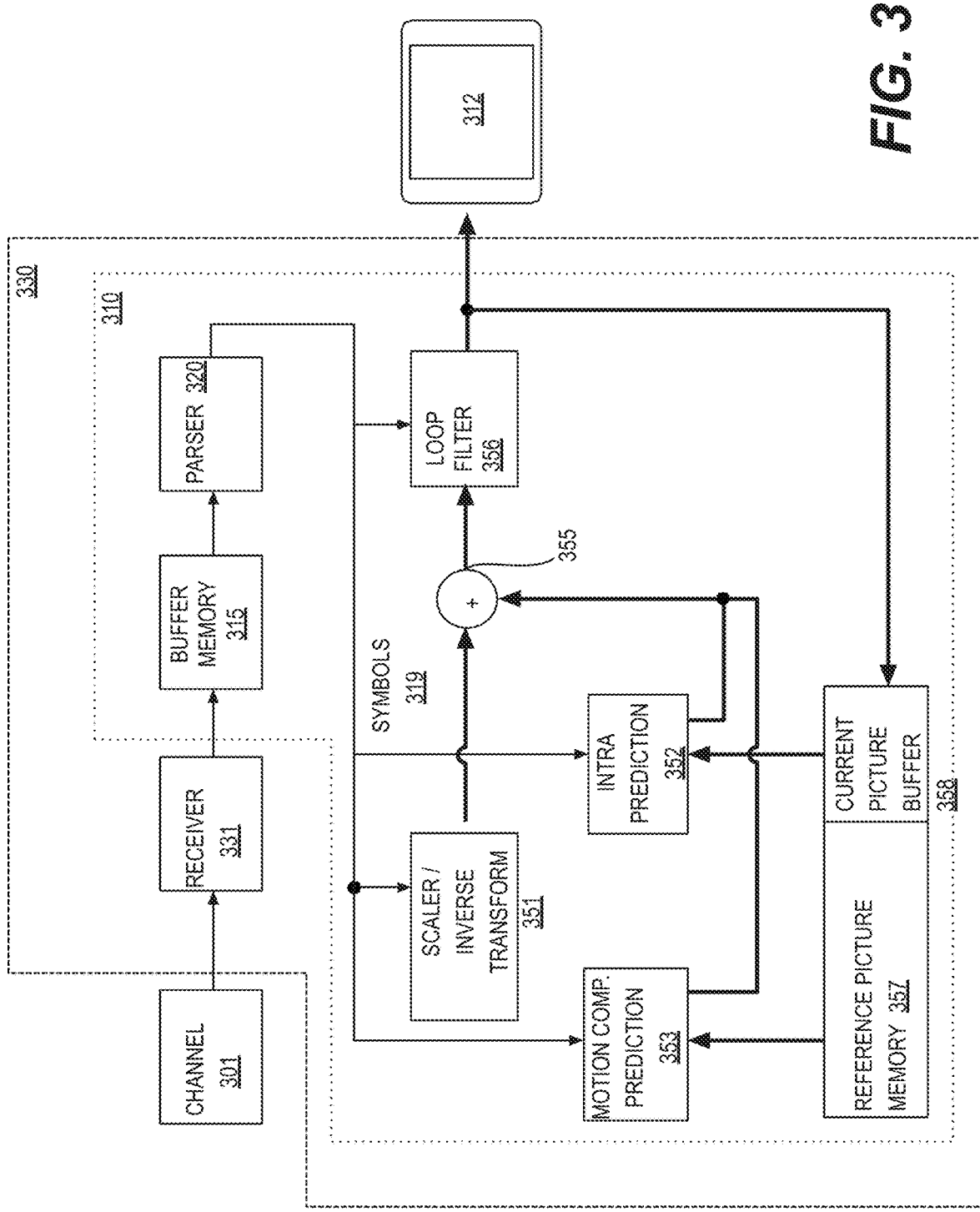
FIG. 3 shows a schematic illustration of a simplified block diagram of a video decoder in accordance with an example embodiment.

FIG. 3 shows a block diagram of a video decoder (310) of an electronic device (330) according to any embodiment of the present disclosure below. The electronic device (330) can include a receiver (331) (e.g., receiving circuitry). The video decoder (310) can be used in place of the video decoder (210) in the example of FIG. 2.

As shown, in FIG. 3, the receiver (331) may receive one or more coded video sequences from a channel (301). To combat network jitter and/or handle playback timing, a buffer memory (315) may be disposed in between the receiver (331) and an entropy decoder/parser (320) ("parser (320)" henceforth). The parser (320) may reconstruct symbols (321) from the coded video sequence. Categories of those symbols include information used to manage operation of the video decoder (310), and potentially information to control a rendering device such as display (312) (e.g., a display screen). The parser (320) may parse/entropy-decode the coded video sequence. The parser (320) may extract from the coded video sequence, a set of subgroup parameters for at least one of the subgroups of pixels in the video decoder. The subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients (e.g., Fourier transform coefficients), quantizer parameter values, motion vectors, and so forth. Reconstruction of the symbols (321) can involve multiple different processing or functional units. The units that are involved and how they are involved may be controlled by the subgroup control information that was parsed from the coded video sequence by the parser (320).

A first unit may include the scaler/inverse transform unit (351). The scaler/inverse transform unit (351) may receive a quantized transform coefficient as well as control information, including information indicating which type of inverse transform to use, block size, quantization factor/parameters, quantization scaling matrices, and the lie as symbol(s) (321) from the parser (320). The scaler/inverse transform unit (351) can output blocks comprising sample values that can be input into aggregator (355).

In some cases, the output samples of the scaler/inverse transform (351) can pertain to an intra coded block, i.e., a block that does not use predictive information from previously reconstructed pictures, but can use predictive information from previously reconstructed parts of the current picture. Such predictive information can be provided by an intra picture prediction unit (352). In some cases, the intra picture prediction unit (352) may generate a block of the same size and shape of the block under reconstruction using surrounding block information that is already reconstructed and stored in the current picture buffer (358). The current picture buffer (358) buffers, for example, partly reconstructed current picture and/or fully reconstructed current picture. The aggregator (355), in some implementations, may add, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a motion compensation prediction unit (353) can access reference picture memory (357) based on motion vector to fetch samples used for inter-picture prediction. After motion compensating the fetched reference samples in accordance with the symbols (321) pertaining to the block, these samples can be added by the aggregator (355) to the output of the scaler/inverse transform unit (351) (output of unit 351 may be referred to as the residual samples or residual signal) so as to generate output sample information.

The output samples of the aggregator (355) can be subject to various loop filtering techniques in the loop filter unit (356) including several types of loop filters. The output of the loop filter unit (356) can be a sample stream that can be output to the rendering device (312) as well as stored in the reference picture memory (357) for use in future inter-picture prediction.

Figure 4:
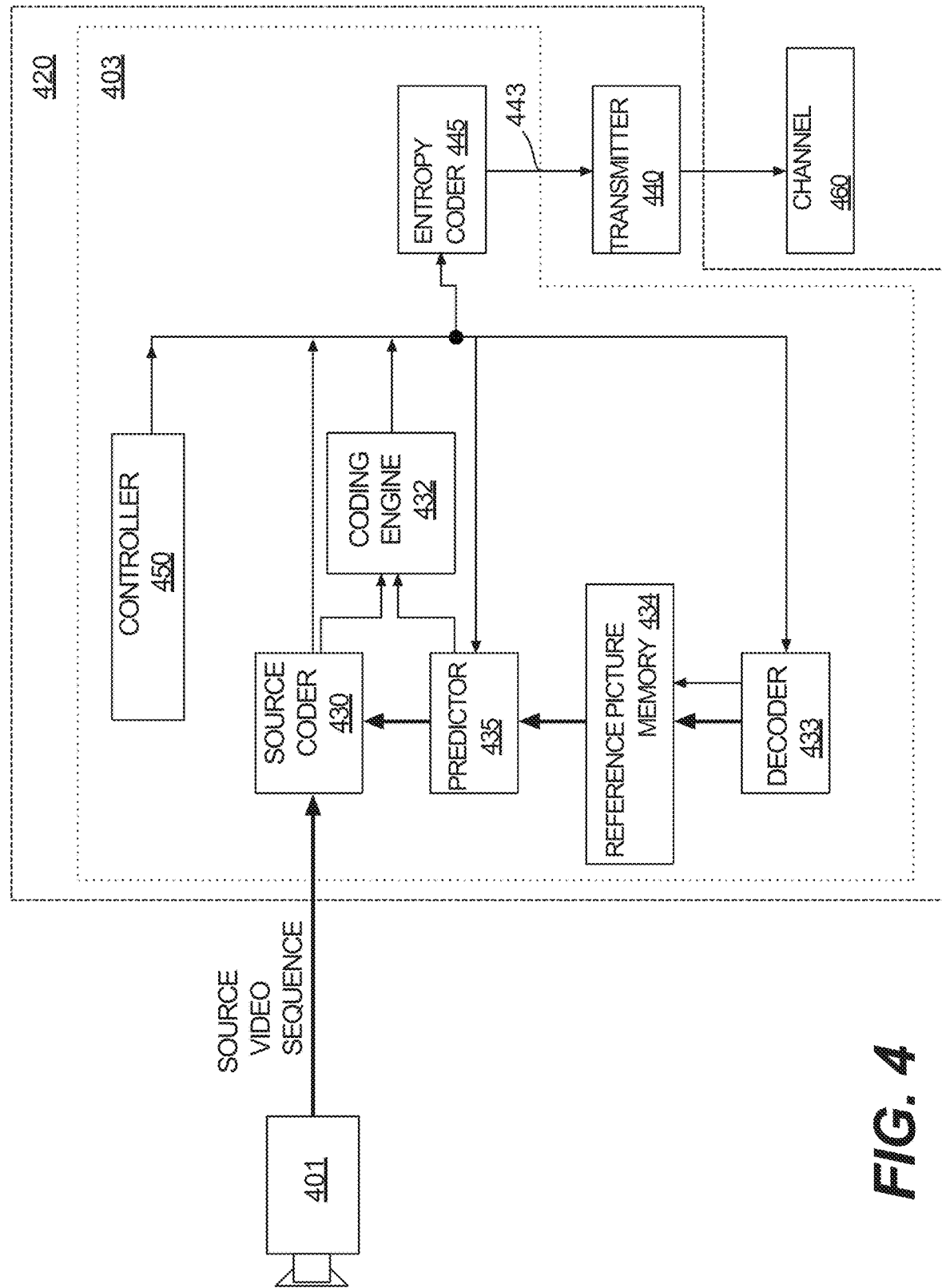
FIG. 4 shows a schematic illustration of a simplified block diagram of a video encoder in accordance with an example embodiment.

FIG. 4 shows a block diagram of a video encoder (403) according to an example embodiment of the present disclosure. The video encoder (403) may be included in an electronic device (420). The electronic device (420) may further include a transmitter (440) (e.g., transmitting circuitry). The video encoder (403) can be used in place of the video encoder (403) in the example of FIG. 4.

The video encoder (403) may receive video samples from a video source (401). According to some example embodiments, the video encoder (403) may code and compress the pictures of the source video sequence into a coded video sequence (443) in real time or under any other time constraints as required by the application. Enforcing appropriate coding speed constitutes one function of a controller (450). In some embodiments, the controller (450) may be functionally coupled to and control other functional units as described below. Parameters set by the controller (450) can include rate control related parameters (picture skip, quantizer, lambda value of rate-distortion optimization techniques, . . . ), picture size, group of pictures (GOP) layout, maximum motion vector search range, and the like.

In some example embodiments, the video encoder (403) may be configured to operate in a coding loop. The coding loop can include a source coder (430), and a (local) decoder (433) embedded in the video encoder (403). The decoder (433) reconstructs the symbols to create the sample data in a similar manner as a (remote) decoder would create even though the embedded decoder 433 process coded video steam by the source coder 430 without entropy coding (as any compression between symbols and coded video bitstream in entropy coding may be lossless in the video compression technologies considered in the disclosed subject matter). An observation that can be made at this point is that any decoder technology except the parsing/entropy decoding that may only be present in a decoder also may necessarily need to be present, in substantially identical functional form, in a corresponding encoder. For this reason, the disclosed subject matter may at times focus on decoder operation, which allies to the decoding portion of the encoder. The description of encoder technologies can thus be abbreviated as they are the inverse of the comprehensively described decoder technologies. Only in certain areas or aspects a more detail description of the encoder is provided below.

During operation in some example implementations, the source coder (430) may perform motion compensated predictive coding, which codes an input picture predictively with reference to one or more previously coded picture from the video sequence that were designated as "reference pictures."

The local video decoder (433) may decode coded video data of pictures that may be designated as reference pictures. The local video decoder (433) replicates decoding processes that may be performed by the video decoder on reference pictures and may cause reconstructed reference pictures to be stored in a reference picture cache (434). In this manner, the video encoder (403) may store copies of reconstructed reference pictures locally that have common content as the reconstructed reference pictures that will be obtained by a far-end (remote) video decoder (absent transmission errors).

The predictor (435) may perform prediction searches for the coding engine (432). That is, for a new picture to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures.

The controller (450) may manage coding operations of the source coder (430), including, for example, setting of parameters and subgroup parameters used for encoding the video data.

Output of all aforementioned functional units may be subjected to entropy coding in the entropy coder (445). The transmitter (440) may buffer the coded video sequence(s) as created by the entropy coder (445) to prepare for transmission via a communication channel (460), which may be a hardware/software link to a storage device which would store the encoded video data. The transmitter (440) may merge coded video data from the video coder (403) with other data to be transmitted, for example, coded audio data and/or ancillary data streams (sources not shown).

The controller (450) may manage operation of the video encoder (403). During coding, the controller (450) may assign to each coded picture a certain coded picture type, which may affect the coding techniques that may be applied to the respective picture. For example, pictures often may be assigned as one of the following picture types: an Intra Picture (I picture), a predictive picture (P picture), a bi-directionally predictive picture (B Picture), a multiple-predictive picture. Source pictures commonly may be subdivided spatially into a plurality of sample coding blocks as described in further detail below.

Figure 5:
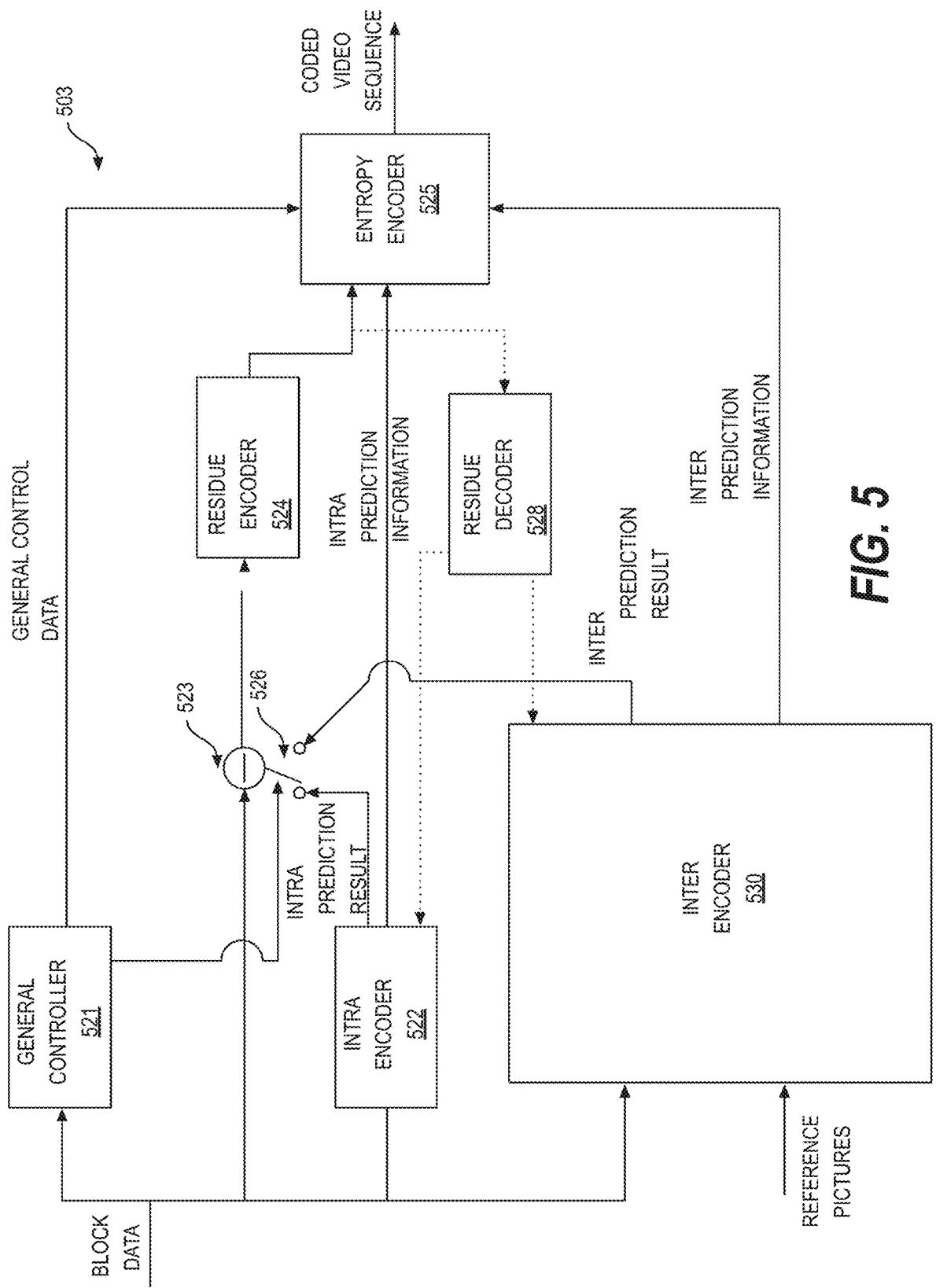
FIG. 5 shows a block diagram of a video encoder in accordance with another example embodiment.

FIG. 5 shows a diagram of a video encoder (503) according to another example embodiment of the disclosure. The video encoder (503) is configured to receive a processing block (e.g., a prediction block) of sample values within a current video picture in a sequence of video pictures, and encode the processing block into a coded picture that is part of a coded video sequence. The example video encoder (503) may be used in place of the video encoder (403) in the FIG. 4 example.

For example, the video encoder (503) receives a matrix of sample values for a processing block. The video encoder (503) then determines whether the processing block is best coded using intra mode, inter mode, or bi-prediction mode using, for example, rate-distortion optimization (RDO).

In the example of FIG. 5, the video encoder (503) includes an inter encoder (530), an intra encoder (522), a residue calculator (523), a switch (526), a residue encoder (524), a general controller (521), and an entropy encoder (525) coupled together as shown in the example arrangement in FIG. 5.

The inter encoder (530) is configured to receive the samples of the current block (e.g., a processing block), compare the block to one or more reference blocks in reference pictures (e.g., blocks in previous pictures and later pictures in display order), generate inter prediction information (e.g., description of redundant information according to inter encoding technique, motion vectors, merge mode information), and calculate inter prediction results (e.g., predicted block) based on the inter prediction information using any suitable technique.

The intra encoder (522) is configured to receive the samples of the current block (e.g., a processing block), compare the block to blocks already coded in the same picture, and generate quantized coefficients after transform, and in some cases also to generate intra prediction information (e.g., an intra prediction direction information according to one or more intra encoding techniques).

The general controller (521) may be configured to determine general control data and control other components of the video encoder (503) based on the general control data to, for example, determine the prediction mode of the block and provides a control signal to the switch (526) based on the prediction mode.

The residue calculator (523) may be configured to calculate a difference (residue data) between the received block and prediction results for the block selected from the intra encoder (522) or the inter encoder (530). The residue encoder (524) may be configured to encode the residue data to generate transform coefficients. The transform coefficients are then subject to quantization processing to obtain quantized transform coefficients. In various example embodiments, the video encoder (503) also includes a residual decoder (528). The residual decoder (528) is configured to perform inverse-transform, and generate the decoded residue data. The entropy encoder (525) may be configured to format the bitstream to include the encoded block and perform entropy coding.

Figure 6:
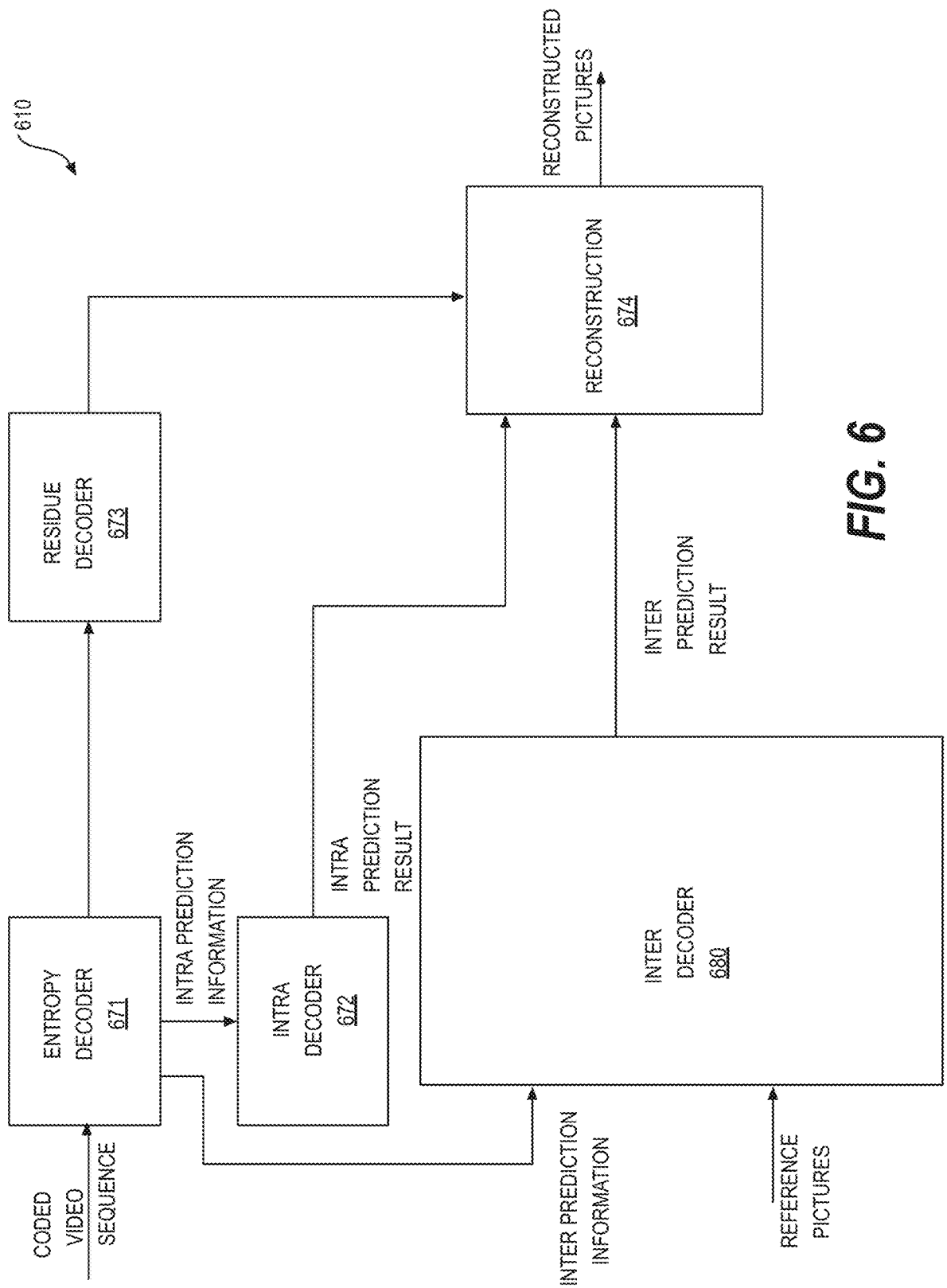
FIG. 6 shows a block diagram of a video decoder in accordance with another example embodiment.

FIG. 6 shows a diagram of an example video decoder (610) according to another embodiment of the disclosure. The video decoder (610) is configured to receive coded pictures that are part of a coded video sequence, and decode the coded pictures to generate reconstructed pictures. In an example, the video decoder (610) may be used in place of the video decoder (410) in the example of FIG. 4.

In the example of FIG. 6, the video decoder (610) includes an entropy decoder (671), an inter decoder (680), a residual decoder (673), a reconstruction module (674), and an intra decoder (672) coupled together as shown in the example arrangement of FIG. 6.

The entropy decoder (671) can be configured to reconstruct, from the coded picture, certain symbols that represent the syntax elements of which the coded picture is made up. The inter decoder (680) may be configured to receive the inter prediction information, and generate inter prediction results based on the inter prediction information. The intra decoder (672) may be configured to receive the intra prediction information, and generate prediction results based on the intra prediction information. The residual decoder (673) may be configured to perform inverse quantization to extract de-quantized transform coefficients, and process the de-quantized transform coefficients to convert the residual from the frequency domain to the spatial domain. The reconstruction module (674) may be configured to combine, in the spatial domain, the residual as output by the residual decoder (673) and the prediction results (as output by the inter or intra prediction modules as the case may be) to form a reconstructed block forming part of the reconstructed picture as part of the reconstructed video.

It is noted that the video encoders (203), (403), and (503), and the video decoders (210), (310), and (610) can be implemented using any suitable technique. In some example embodiments, the video encoders (203), (403), and (503), and the video decoders (210), (310), and (610) can be implemented using one or more integrated circuits. In another embodiment, the video encoders (203), (403), and (503), and the video decoders (210), (310), and (610) can be implemented using one or more processors that execute software instructions.

Turning to block partitioning for coding and decoding, general partitioning may start from a base block and may follow a predefined ruleset, particular patterns, partition trees, or any partition structure or scheme. The partitioning may be hierarchical and recursive. After dividing or partitioning a base block following any of the example partitioning procedures or other procedures described below, or the combination thereof, a final set of partitions or coding blocks may be obtained. Each of these partitions may be at one of various partitioning levels in the partitioning hierarchy, and may be of various shapes. Each of the partitions may be referred to as a coding block (CB). For the various example partitioning implementations described further below, each resulting CB may be of any of the allowed sizes and partitioning levels. Such partitions are referred to as coding blocks because they may form units for which some basic coding/decoding decisions may be made and coding/decoding parameters may be optimized, determined, and signaled in an encoded video bitstream. The highest or deepest level in the final partitions represents the depth of the coding block partitioning structure of tree. A coding block may be a luma coding block or a chroma coding block. The CB tree structure of each color may be referred to as coding block tree (CBT). The coding blocks of all color channels may collectively be referred to as a coding unit (CU). The hierarchical structure of for all color channels may be collectively referred to as coding tree unit (CTU). The partitioning patterns or structures for the various color channels in in a CTU may or may not be the same.

In some implementations, partition tree schemes or structures used for the luma and chroma channels may not need to be the same. In other words, luma and chroma channels may have separate coding tree structures or patterns. Further, whether the luma and chroma channels use the same or different coding partition tree structures and the actual coding partition tree structures to be used may depend on whether the slice being coded is a P, B, or I slice. For example, For an I slice, the chroma channels and luma channel may have separate coding partition tree structures or coding partition tree structure modes, whereas for a P or B slice, the luma and chroma channels may share a same coding partition tree scheme. When separate coding partition tree structures or modes are applied, a luma channel may be partitioned into CBs by one coding partition tree structure, and a chroma channel may be partitioned into chroma CBs by another coding partition tree structure.

Figure 7:
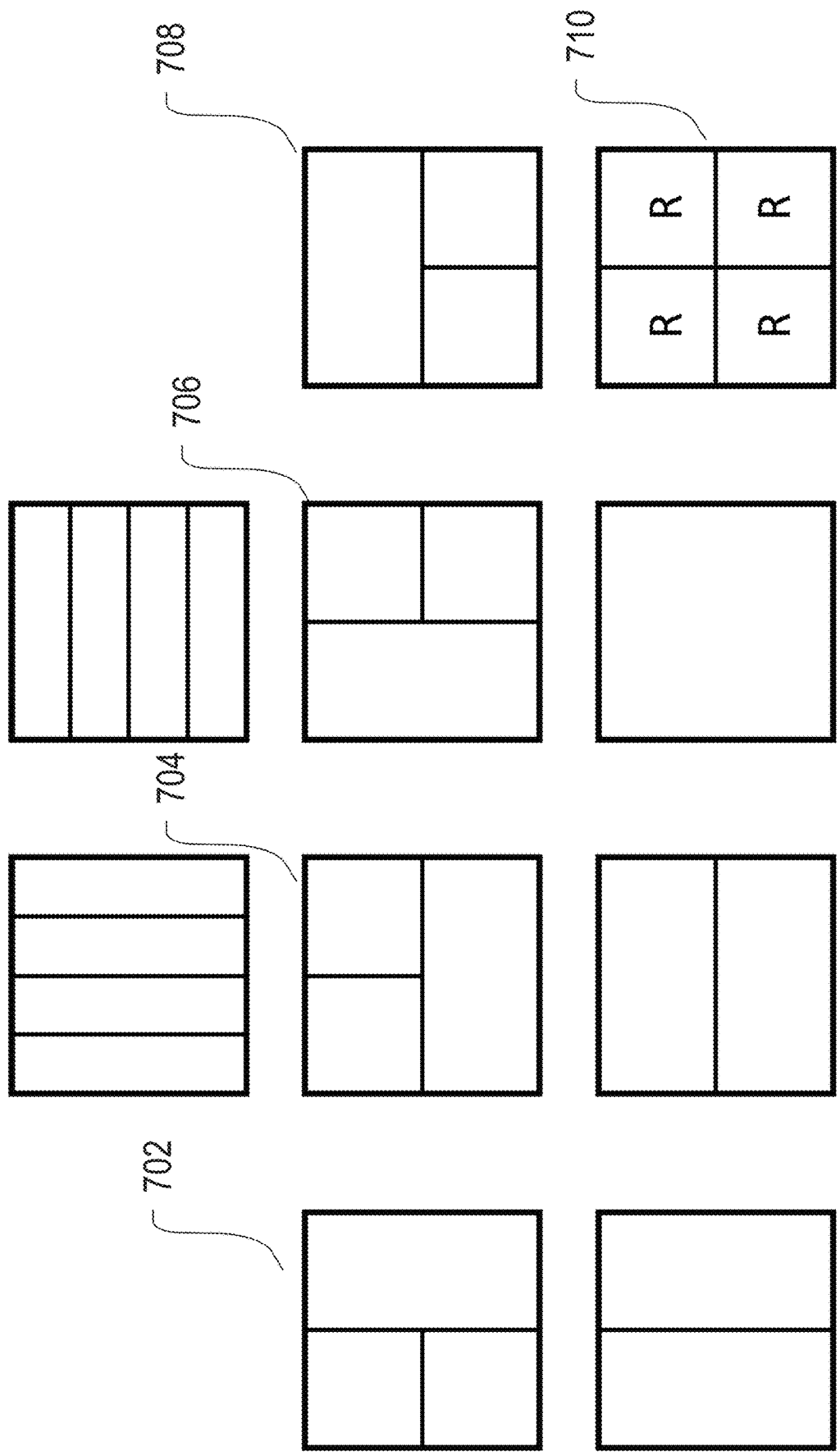
FIG. 7 shows a scheme of coding block partitioning according to example embodiments of the disclosure.

FIG. 7 shows an example predefined 10-way partitioning structure/pattern allowing recursive partitioning to form a partitioning tree. The root block may start at a predefined level (e.g. from a base block at 128×128 or 64×64 level). The example partitioning structure of FIG. 7 includes various 2:1/1:2 and 4:1/1:4 rectangular partitions. In some example implementations, none of the rectangular partitions of FIG. 7 is allowed to be further subdivided. A coding tree depth may be further defined to indicate the splitting depth from the root node or root block. For example, the coding tree depth for the root node or root block may be set to 0, and after the root block is further split once following FIG. 7, the coding tree depth is increased by 1. In some implementations, only the all-square partitions in 710 may be allowed for recursive partitioning into the next level of the partitioning tree following pattern of FIG. 7.

In some other example implementations for coding block partitioning, a quadtree structure may be used. Such quadtree splitting may be applied hierarchically and recursively to any square shaped partitions. Whether a base block or an intermediate block or partition is further quadtree split may be adapted to various local characteristics of the base block or intermediate block/partition.

In yet some other examples, a ternary partitioning scheme may be used for partitioning a base block or any intermediate block, as shown in FIG. 8. The ternary pattern may be implemented vertical, as shown in 802, or horizontal, as shown in 804. While the example split ratio in FIG. 8 is shown as 1:2:1, other ratios may be predefined. In some implementations, two or more different ratios may be predefined. In some implementations, the width and height of the partitions of the example triple trees are always power of 2 to avoid additional transforms.

The above partitioning schemes may be combined in any manner at different partitioning levels. As one example, the quadtree and the binary partitioning schemes described above may be combined to partition a base block into a quadtree-binary-tree (QTBT) structure. In such a scheme, a base block or an intermediate block/partition may be either quadtree split or binary split, subject to a set of predefined conditions, if specified. A particular example is illustrated in FIG. 9, where a base block is first quadtree split into four partitions, as shown by 902, 904, 906, and 908. Thereafter, each of the resulting partitions is either quadtree partitioned into four further partitions (such as 908), or binarily split into two further partitions (either horizontally or vertically, such as 902 or 906, both being symmetric, for example) at the next level, or non-split (such as 904). Binary or quadtree splitting may be allowed recursively for square shaped partitions, as shown by the overall example partition pattern of 910 and the corresponding tree structure/representation in 920, in which the solid lines represent quadtree splitting, and the dashed lines represent binary splitting. Flags may be used for each binary splitting node (non-leaf binary partitions) to indicate whether the binary splitting is horizontal or vertical. For example, as shown in 920, consistent with the partitioning structure of 910, flag "0" may represent horizontal binary splitting, and flag "1" may represent vertical binary splitting. For the quadtree-split partition, there is no need to indicate the splitting type since quadtree splitting always splits a block or a partition both horizontally and vertically to produce 4 sub-blocks/partitions with an equal size. In some implementations, flag "1" may represent horizontal binary splitting, and flag "0" may represent vertical binary splitting.

In some example implementations of the QTBT, the quadtree and binary splitting ruleset may be represented by the following predefined parameters and the corresponding functions associated therewith:
  CTU size: the root node size of a quadtree (size of a base block)
  MinQTSize: the minimum allowed quadtree leaf node size
  MaxBTSize: the maximum allowed binary tree root node size
  MaxBTDepth: the maximum allowed binary tree depth
  MinBTSize: the minimum allowed binary tree leaf node size In some example implementations of the QTBT partitioning structure, the CTU size may be set as 128×128 luma samples with two corresponding 64×64 blocks of chroma samples (when an example chroma sub-sampling is considered and used), the MinQTSize may be set as 16×16, the MaxBTSize may be set as 64×64, the MinBTSize (for both width and height) may be set as 4×4, and the MaxBTDepth may be set as 4. The quadtree partitioning may be applied to the CTU first to generate quadtree leaf nodes. The quadtree leaf nodes may have a size from its minimum allowed size of 16×16 (i.e., the MinQTSize) to 128×128 (i.e., the CTU size). If a node is 128×128, it will not be first split by the binary tree since the size exceeds the MaxBTSize (i.e., 64×64). Otherwise, nodes which do not exceed MaxBTSize could be partitioned by the binary tree. In the example of FIG. 9, the base block is 128×128. The basic block can only be quadtree split, according to the predefined ruleset. The base block has a partitioning depth of 0. Each of the resulting four partitions are 64×64, not exceeding MaxBTSize, may be further quadtree or binary-tree split at level 1. The process continues. When the binary tree depth reaches MaxBTDepth (i.e., 4), no further splitting may be considered. When the binary tree node has width equal to MinBTSize (i.e., 4), no further horizontal splitting may be considered. Similarly, when the binary tree node has height equal to MinBTSize, no further vertical splitting is considered.

In some example implementations, the QTBT scheme above may be configured to support a flexibility for the luma and chroma to have the same QTBT structure or separate QTBT structures. For example, for P and B slices, the luma and chroma CTBs in one CTU may share the same QTBT structure. However, for I slices, the luma CTBs maybe partitioned into CBs by a QTBT structure, and the chroma CTBs may be partitioned into chroma CBs by another QTBT structure. This means that a CU may be used to refer to different color channels in an I slice, e.g., the I slice may consist of a coding block of the luma component or coding blocks of two chroma components, and a CU in a P or B slice may consist of coding blocks of all three colour components.

The various CB partitioning schemes above and the further partitioning of CBs into PBs may be combined in any manner. The following particular implementations are provided as non-limiting examples.

Inter-prediction may be implemented, for example, in a single-reference mode or a compound-reference mode. In some implementations, a skip flag may be first included in the bitstream for a current block (or at a higher level) to indicate whether the current block is inter-coded and is not to be skipped. If the current block is inter-coded, then another flag may be further included in the bitstream as a signal to indicate whether the single-reference mode or compound-reference mode is used for the prediction of the current block. For the single-reference mode, one reference block may be used to generate the prediction block for the current block. For the compound-reference mode, two or more reference blocks may be used to generate the prediction block by, for example, weighted average. The reference block or reference blocks may be identified using reference frame index or indices and additionally using corresponding motion vector or motion vectors which indicate shift(s) between the reference block(s) and the current blocks in location relative to a frame, e.g., in horizontal and vertical pixels. For example, the inter-prediction block for the current block may be generated from a single-reference block identified by one motion vector in a reference frame as the prediction block in the single-reference mode, whereas for the compound-reference mode, the prediction block may be generated by a weighted average of two reference blocks in two reference frames indicated by two reference frame indices and two corresponding motion vectors. The motion vector(s) may be coded and included in the bitstream in various manners.

In some example implementations, one or more reference picture lists containing identification of short-term and long-term reference frames for inter-prediction may be formed based on the information in the Reference Picture Set (RPS). For example, a single picture reference list may be formed for uni-directional inter-prediction, denoted as L0 reference (or reference list 0) whereas two picture referenced lists may be formed for bi-direction inter-prediction, denoted as L0 (or reference list 0) and L1 (or reference list 1) for each of the two prediction directions. The reference frames included in the L0 and L1 lists may be ordered in various predetermined manners. The lengths of the L0 and L1 lists may be signaled in the video bitstream. Uni-directional inter-prediction may be either in the single-reference mode, or in the compound-reference mode when the multiple references for the generation of prediction block by weighted average in the compound prediction mode are on a same side of the frame where the block to be predicted is located. Bi-directional inter-prediction may only be compound mode in that bi-directional inter-prediction involves at least two reference blocks.

In some implementations, a merge mode (MM) for inter-prediction may be implemented. Generally, for the merge mode, the motion vector in single-reference prediction or one or more of the motion vectors in compound-reference prediction for the current PB may be derived from other motion vector(s) rather than being computed and signaled independently. For example, in an encoding system, the current motion vector(s) for the current PB may be represented by difference(s) between the current motion vector(s) and other one or more already encoded motion vectors (referred to as reference motion vectors). Such difference(s) in motion vector(s) rather than the entirety of the current motion vector(s) may be encoded and included in the bit stream and may be linked to the reference motion vector(s). Correspondingly in a decoding system, the motion vector(s) corresponding to the current PB may be derived based on the decoded motion vector difference(s) and decoded reference motion vector(s) linked therewith. As a specific form of the general merge mode (MM) inter-prediction, such inter-prediction based on motion vector difference(s) may be referred to as Merge Mode with Motion Vector Difference (MMVD). MM in general or MMVD in particular may thus be implemented to leverage correlations between motion vectors associated with different PBs to improve coding efficiency. For example, neighboring PBs may have similar motion vectors and thus the MVD may be small and can be efficiently coded. For another example, motion vectors may correlate temporally (between frames) for similarly located/positioned blocks in space.

In some example implementations of MMVD, a list of reference motion vector (RMV) or MV predictor candidates for motion vector prediction may be formed for a block being predicted. The list of RMV candidates may contain a predetermined number (e.g., 2) of MV predictor candidate blocks whose motion vectors may be used for predicting the current motion vector. The RMV candidate blocks may include blocks selected from neighboring blocks in the same frame and/or temporal blocks (e.g., identically located blocks in proceeding or subsequent frame of the current frame). These options represent blocks at spatial or temporal locations relative to the current block that are likely to have similar or identical motion vectors to the current block. The size of the list of MV predictor candidates may be predetermined. For example, the list may contain two or more candidates. To be on the list of RMV candidates, a candidate block, for example, may be required to have the same reference frame (or frames) as the current block, must exist (e.g., when the current block is near the edge of the frame, a boundary check needs to be performed), and must be already encoded during an encoding process, and/or already decoded during a decoding process. In some implementations, the list of merge candidates may be first populated with spatially neighboring blocks (scanned in particular predefined order) if available and meeting the conditions above, and then the temporal blocks if space is still available in the list. The neighboring RMV candidate blocks, for example, may be selected from left and top blocks of the current bock. The list of RMV predictor candidates may be dynamically formed at various levels (sequence, picture, frame, slice, superblock, etc.) as a Dynamic Reference List (DRL). DRL may be signaled in the bitstream.

In some implementations, an actual MV predictor candidate being used as a reference motion vector for predicting a motion vector of the current block may be signaled. In the case that the RMV candidate list contains two candidates, a one-bit flag, referred to as merge candidate flag may be used to indicate the selection of the reference merge candidate. For a current block being predicted in compound mode, each of the multiple motion vectors predicted using an MV predictor may be associated with reference motion vector from the merge candidate list. The encoder may determine which of the RMV candidate more closely predicts the MV of a current coding block and signal the selection as an index into the DRL.

In some example implementations of MMVD, after an RMV candidate is selected and used as base motion vector predictor for a motion vector to be predicted, a motion vector difference (MVD or a delta MV, representing the difference between the motion vector to be predicted and the reference candidate motion vector) may be calculated in the encoding system. Such MVD may include information representing a magnitude of MV difference and a direction of the MV difference, both of which may be signaled in the bitstream in various manners.

In some example implementations of the MMVD, a distance index may be used to specify magnitude information of the motion vector difference and to indicate one of a set of pre-defined offsets representing predefined motion vector difference from the starting point (the reference motion vector). An MV offset according to the signaled index may then be added to either horizontal or vertical component of the starting (reference) motion vector. An example predefined relation between distance index and predefined offsets is specified in Table 1.

TABLE 1

Example relation of distance index and pre-defined MV offset

| Distance Index | 0 | 1 | 2 | 3 | 4 | 5 | 6 | 7 |
|---|---|---|---|---|---|---|---|---|
| Offset (in unit of luma sample) | ¼ | ½ | 1 | 2 | 4 | 8 | 16 | 32 |

In some example implementations of the MMVD, a direction index may be further signaled and used to represent a direction of the MVD relative to the reference motion vector. In some implementations, the direction may be restricted to either one of the horizontal and vertical directions. An example 2-bit direction index is shown in Table 2. In the example of Table 2, the interpretation of the MVD could be variant according to the information of the starting/reference MVs. For example, when the starting/reference MV corresponds to a uni-prediction block or corresponds to a bi-prediction block with both reference frame lists point to the same side of the current picture (i.e. POCs of the two reference pictures are both larger than the POC of the current picture, or are both smaller than the POC of the current picture), the sign in Table 2 may specify the sign (direction) of MV offset added to the starting/reference MV. When the starting/reference MV corresponds to a bi-prediction block with the two reference pictures at different sides of the current picture (i.e. the POC of one reference picture is larger than the POC of the current picture, and the POC of the other reference picture is smaller than the POC of the current picture), and a difference between the reference POC in picture reference list 0 and the current frame is greater than that between the reference POC in picture reference list 1 and the current frame, the sign in Table 2 may specify the sign of MV offset added to the reference MV corresponding to the reference picture in picture reference list 0, and the sign for the offset of the MV corresponding to the reference picture in picture reference list 1 may have an opposite value (opposite sign for the offset). Otherwise, if the difference between the reference POC in picture reference list 1 and the current frame is greater than that between the reference POC in picture reference list 0 and the current frame, the sign in Table 2 may then specify the sign of MV offset added to the reference MV associated with the picture reference list 1 and the sign for the offset to the reference MV associated with the picture reference list 0 has opposite value.

TABLE 2

Example implementations for sign of MV offset specified by direction index

| Direction IDX | 00 | 01 | 10 | 11 |
|---|---|---|---|---|
| x-axis (horizontal) | + | − | N/A | N/A |
| y-axis (vertical) | N/A | N/A | + | − |

In some example implementations, the MVD may be scaled according to the difference of POCs in each direction. If the differences of POCs in both lists are the same, no scaling is needed. Otherwise, if the difference of POC in reference list 0 is larger than the one of reference list 1, the MVD for reference list 1 is scaled. If the POC difference of reference list 1 is greater than list 0, the MVD for list 0 may be scaled in the same way. If the starting MV is uni-predicted, the MVD is added to the available or reference MV.

In some example implementations of MVD coding and signaling for bi-directional compound prediction, in addition or alternative to separately coding and signaling the two MVDs, a symmetric MVD coding may be implemented such that only one MVD needs signaling and the other MVD may be derived from the signaled MVD. In such implementations, motion information including reference picture indices of list-0 and list-1 are not both signaled. Specifically, at a slice level, a flag may be included in the bitstream, referred to as "mvd_11_zero_flag," for indicating whether the reference list-1 is not signaled in the bitstream. If this flag is 1, indicating that reference list-1 is equal to zero (and thus not signaled), then a bi-directional-prediction flag, referred to as "BiDirPredFlag" may be set to 0, meaning that there is no bi-directional-prediction. Otherwise, if mvd_11_zero_flag is zero, if the nearest reference picture in list-0 and the nearest reference picture in list-1 form a forward and backward pair of reference pictures or a backward and forward pair of reference pictures, BiDirPredFlag may be set to 1, and both list-0 and list-1 reference pictures are short-term reference pictures. Otherwise BiDirPredFlag is set to 0. BiDirPredFlag of 1 may indicate that a symmetrical mode flag is additionally signalled in the bitstream. The decoder may extract the symmetrical mode flag from the bitstream when BiDirPredFlag is 1. The symmetrical mode flag, for example, may be signaled (if needed) at the CU level and it may indicate whether the symmetrical MVD coding mode is being used for the corresponding CU. When the symmetrical mode flag is 1, it indicates the use of the symmetrical MVD coding mode, and that only reference picture indices of both list-0 and list-1 (referred to as "mvp_10_flag" and "mvp_11_flag") are signaled with MVD associated with the list-0 (referred to as "MVD0"), and that the other motion vector difference, "MVD1", is to be derived rather than signaled. For example, MVD1 may be derived as −MVD0. As such, only one MVD is signaled in the example symmetrical MVD mode.

In some other example implementations for MV prediction, a harmonized scheme may be used to implement a general merge mode, MMVD, and some other types of MV prediction, for both single-reference mode and compound-reference mode MV prediction. Various syntax elements may be used to signal the manner in which the MV for a current block is predicted. For example, for single-reference mode, the following MV prediction modes may be signaled: NEARMV—use one of the motion vector predictors (MVP) in the list indicated by a DRL (Dynamic Reference List) index directly without any MVD; NEWMV—use one of the motion vector predictors (MVP) in the list signaled by a DRL index as reference and apply a delta to the MVP (e.g., using MVD); and GLOBALMV—use a motion vector based on frame-level global motion parameters.

Likewise, for the compound-reference inter-prediction mode using two reference frames corresponding to two MVs to be predicted, the following MV prediction modes may be signaled: NEAR_NEARMV—use one of the motion vector predictors (MVP) in the list signaled by a DRL index without MVD for each of the two of MVs to be predicted. NEAR_NEWMV—for predicting the first of the two motion vectors, use one of the motion vector predictors (MVP) in the list signaled by a DRL index as reference MV without MVD; for predicting the second of the two motion vectors, use one of the motion vector predictors (MVP) in the list signaled by a DRL index as reference MV in conjunction with an additionally signaled delta MV (an MVD). NEW_NEARMV—for predicting the second of the two motion vectors, use one of the motion vector predictors (MVP) in the list signaled by a DRL index as reference MV without MVD; for predicting the first of the two motion vectors, use one of the motion vector predictors (MVP) in the list signaled by a DRL index as reference MV in conjunction with an additionally signaled delta MV (an MVD). NEW_NEWMV—use one of the motion vector predictors (MVP) in the list signaled by a DRL index as reference MV and use it in conjunction with an additionally signaled delta MV to predict for each of the two MVs. GLOBAL_GLOBALMV—use MVs from each reference based on their frame-level global motion parameters.

The term "NEAR" above thus refers to MV prediction using a reference MV without any MVD as a general merge mode, whereas the term "NEW" refers to MV prediction involving using a reference MV and offsetting it with a signaled or derived MVD as in an MMVD mode. For the compound inter-prediction, both the reference base motion vectors and the motion vector deltas above, may be generally different or independent between the two references or the two MVDs, even though the two MVDs, for example, may be correlated and such correlation may be leveraged to reduce the amount of information needed for signaling the two motion vector deltas. To leverage such correlation, a joint signaling of the two MVDs may be implemented and indicated in the bitstream, as described in further detail below.

In some example implementations of MVD, a predefined pixel resolution for the MVD may be allowed. For example, a ⅛-pixel motion vector precision (or accuracy) may be allowed. The MVD described above in the various MV prediction modes may be constructed and signaled in various manners. In some implementations, various syntax elements may be used to signal the motion vector difference(s) above in reference frame list 0 or list 1.

For example, a syntax element referred to as "mv_joint" may specify which components of the motion vector difference associated therewith are non-zero. m For example, mv_joint having a value of: 0 may indicate that there is no non-zero MVD along either the horizontal or the vertical direction; 1 may indicate that there is non-zero MVD only along the horizontal direction; 2 may indicate that there is non-zero MVD only along the vertical direction; and/or 3 may indicate that there is non-zero MVD along both the horizontal and the vertical directions.

When the "mv_joint" syntax element for an MVD signals that there is no non-zero MVD component, then no further MVD information may be signaled. However, if the "mv_joint" syntax signals that there is one or two non-zero components, then additional syntax elements may be further signaled for each of the non-zero MVD components as described below.

For example, a syntax element referred to as "mv_sign" may be used to additionally specify whether the corresponding motion vector difference component is positive or negative.

For another example, a syntax element referred to as "mv_class" may be used to specify a class of the motion vector difference among a predefined set of classes for the corresponding non-zero MVD component. The predefined classes for motion vector difference, for example, may be used to divide a contiguous magnitude space of the motion vector difference into non-overlapping ranges of classes. A signaled MVD class thus indicates the magnitude range of the corresponding MVD component. In the example implementation shown in Table 3 below, a higher class corresponds to motion vector differences having range of a larger magnitude. The symbol (n, m] is used for representing a range of motion vector difference that is greater than n pixels, and smaller than or equal to m pixels.

TABLE 3

Magnitude class for motion vector difference

| MV class | Magnitude of MVD |
| --- | --- |
| MV_CLASS_0 | (0, 2] |
| MV_CLASS_1 | (2, 4] |
| MV_CLASS_2 | (4, 8] |
| MV_CLASS_3 | (8, 16] |
| MV_CLASS_4 | (16, 32] |
| MV_CLASS_5 | (32, 64] |
| MV_CLASS_6 | (64, 128] |
| MV_CLASS_7 | (128, 256] |
| MV_CLASS_8 | (256, 512] |
| MV_CLASS_9 | (512, 1024] |
| MV_CLASS_10 | (1024, 2048] |

In some other examples, a syntax element referred to as "mv_bit" may be further used to specify an integer part of the offset between the non-zero motion vector difference component and starting magnitude of a correspondingly signaled MV class magnitude range. In some other examples, a syntax element referred to as "mv_fr" may be further used to specify first 2 fractional bits of the motion vector difference for a corresponding non-zero MVD component, whereas a syntax element referred to as "mv_hp" may be used to specify a third fractional bit of the motion vector difference (high resolution bit) for a corresponding non-zero MVD component. The two-bit "mv_fr" essentially provides ¼ pixel MVD resolution, whereas the "mv_hp" bit may further provide a ⅛-pixel resolution. In some other implementations, more than one "mv_hp" bit may be used to provide MVD pixel resolution finer than ⅛ pixel. In some example implementations, additional flags may be signaled at one or more of the various levels to indicate whether ⅛-pixel or higher MVD resolution is supported. If MVD resolution is not applied to a particular coding unit, then the syntax elements above for the corresponding non-supported MVD resolution may not be signaled.

In some example implementations, in a bi-prediction with CU-level weight (BCW), a bi-prediction signal may be generated by averaging two prediction signals obtained from two different reference pictures and/or using two different motion vectors. In some other implementations, the bi-prediction mode may be extended beyond simple averaging to allow weighted averaging of the two prediction signals. For example, $P_{bi-pred}=((8-w)*P_0+w*P_1+4)>>3$. Five weights may be allowed in the weighted averaging bi-prediction, $w \in \{-2, 3, 4, 5, 10\}$. When w is equal to 4, equal weighting factor is used to do the weighted average of two prediction samples. For each bi-predicted CU, the weight w may be determined in one of two ways: 1) for a non-merge CU, the weight index is signalled after the motion vector difference; and/or 2) for a merge CU, the weight index is inferred from neighbouring blocks based on the merge candidate index. BCW may be only applied to CUs with 256 or more luma samples (i.e., CU width times CU height is greater than or equal to 256). For low-delay pictures, all 5 weights are used. For non-low-delay pictures, only 3 weights ($w \in \{3,4,5\}$) are used.

Figure 10:
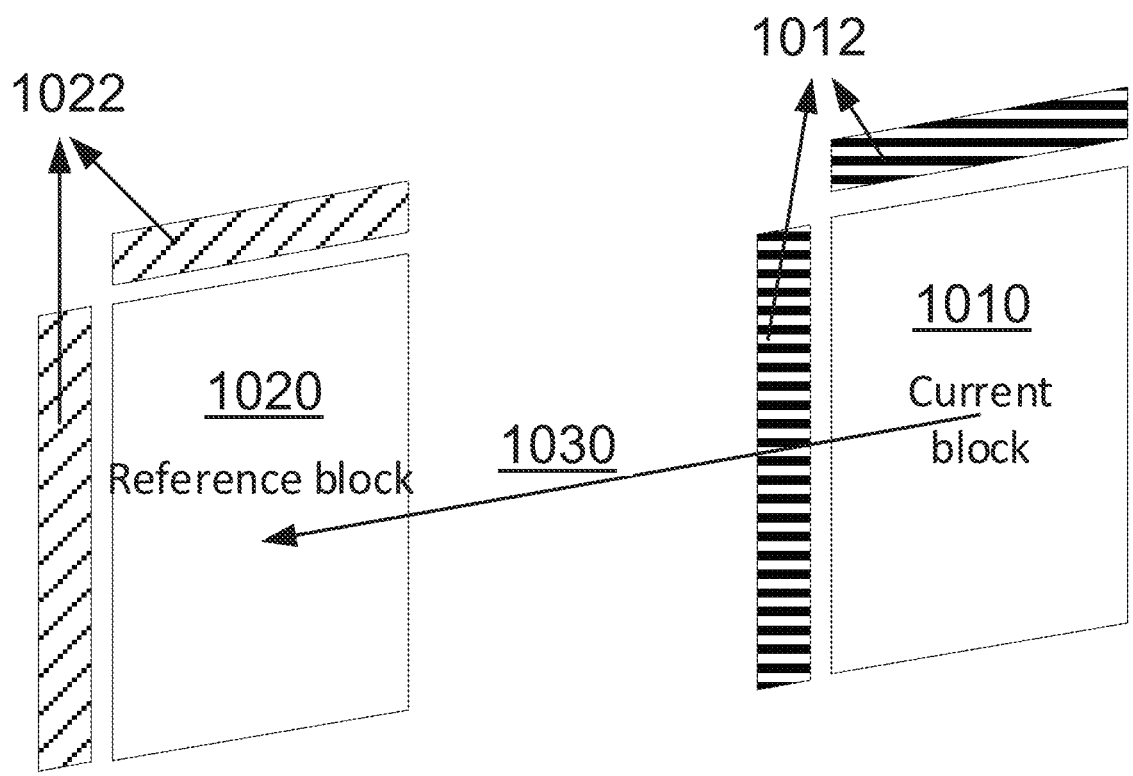
FIG. 10 shows an example of templates of a current block and a reference block.

In some implementations, a block adaptive weighted prediction (BAWP) may comprise a block-level weighted prediction to model local illumination variation between current block and its prediction block as a function of that between current block template (or the causal samples of current block) and reference block template. The template (or referred as current template, 1012) of the current block (1010) and the template (or referred as reference template, 1022) of the reference block (1020) are illustrated in FIG. 10. The reference block may be indicated or determined by a motion vector (MV, 1030). The current block may be in a current picture (or current frame), and the reference block may be in a reference picture (or reference frame). In some implementations, the function may be a linear function. The parameters of the function may be denoted by a scaling factor a and an offset β, which forms a linear equation, that is, $\alpha*p[x]+\beta$ to compensate illumination changes, wherein p[x] is a reference sample pointed to by the MV at a location x on the reference picture. In some implementations, α and β may be derived based on the current block template and the reference block template, and no signaling overhead is required for them. In some implementations, an BAWP flag may be signaled for single inter prediction mode to indicate the use of BAWP. The BAWP may be applied to the blocks with size larger than or equal to 8×8 and coded in single inter prediction mode. In some implementations, the BAWP may be only applied to the luma component. In some implementation, BAWP may be referred as local illumination compensation (LIC).

In some embodiments, if current block consists of more than one motion vectors, and each motion vector is pointing to one block in the reference frame, multiple linear models may be used to describe the linear relationship between current block and its multiple reference blocks in BAWP/LIC mode. For each linear model, the linear function consists of a scale α and an offset β, and the scale α and/or offset β may be derived from the template of current block and template of each of reference block, or signaled into the bitstream and parsed at the decoder side to reconstruct the predicted block. Each of the reference block is specified by the motion vector associated with its reference frame. In one embodiment, if current block consists of more than one motion vectors, and each motion vector is pointing to one block in the reference block, then at least one linear model is employed to describe the linear relationship between current block and one of its reference blocks. In one embodiment, if current block consists of more than one motion vectors, and each motion vector is pointing to one block in the reference frame, then one linear model is employed for each motion vector respectively. Specifically, according to the disclosed method, an example decoder may receive a coded video bitstream. Also, the decoder may identify, from the coded video bitstream, a first motion vector corresponding to a first reference block and a second motion vector corresponding to a second reference block associated with the current block of the current frame. Then, the decoder may obtain a first scaling factor corresponding to the first motion vector and a second scaling factor corresponding to the second motion vector by parsing the coded video bitstream. Furthermore, the decoder may generate a first predicted block based on the first scaling factor and the first reference block according to a first linear equation, the first linear equation being associated with the first scaling factor and a first offset, as well as a second predicted block based on the second reference block according to a second linear equation, the second linear equation being associated with the second scaling factor and a second offset. Then, the decoder can reconstruct the current block based on the first predicted block and the second predicted block.

In some implementations with explicit signaling of BAWP, when a current block is predicted from its reference block using a linear function with a scale a and an offset, the selection/value of scale α and/or offset β may be signaled into the bitstream and parsed at the decoder side to reconstruct the predicted block. The reference block is specified by the motion vector associated with the current block. All the supported values for scale a are stored in a pre-defined look-up table, and the index of the scaling factors in the look-up table may be signaled in the bitstream and parsed at the decoder side. The offset values β may be derived from the linear equation between reference block and current block. Offset values β is set to (cur_template_mean−α*ref_template_mean), wherein cur_template_mean indicates the average of samples in the template of current block and ref_template_mean indicates the average of samples in the template of reference block.

In some implementations, one or more spatial motion vector predictor (SMVP, both adjacent and non-adjacent SMVP), one or more temporal motion vector predictor (TMVP), one or more extra MV candidates and additionally derived MVP, and one or more reference bank MVP are additional added. A stack with a fixed size may be generated both at the encoder and decoder side to store the MVP, which is known as motion vector predictor list.

The MVP list may be constructed to hold a predetermined number of reconstructed MVP candidates (either SMVPs, TMVPs, or other derived MVPs, or other types of MVP candidates) on both encoder side and decoder side for a current coding block or superblock. When encoding a current prediction block in an inter-prediction mode, the encoder would select from the candidates in the MVP candidate list an MVP that provides optimal coding efficiency as the predictor of the motion vector for the current prediction block. The index of the selected MVP in the MVP list may be signaled in the bitstream. A decoder would correspondingly update the MVP list for the current coding block or super block as the bitstream is reconstructed, extract the MVP index for a current inter-predicted prediction block, obtain the MVP from the MVP candidate list according to the extracted MVP index in the MVP list and use MVP as the predictor of the motion vector for the current prediction block in order to reconstruct the motion vector for the current prediction block (e.g., by combining the extracted motion vector predictor from the MVP list and a corresponding MVD). The MVP list, for example, may represent a stack with predetermined fixed size.

The spatial motion vector predictors may be either adjacent SMVPs or non-adjacent SMVPs. The adjacent SMVPs may refer to motion vector predictors belonging to prediction blocks adjacent to the current coding block or super block. Non-adjacent SMVPs may refer to motion vector predictors belonging to prediction blocks that are not immediately next to the current coding block or super block. Other types of MVP candidates may be further derived from reconstructed motion vectors. For another example, one or more additional MVP banks may be maintained as one of the sources for establishing the MVP list, as described in further detail below.

Figure 11:
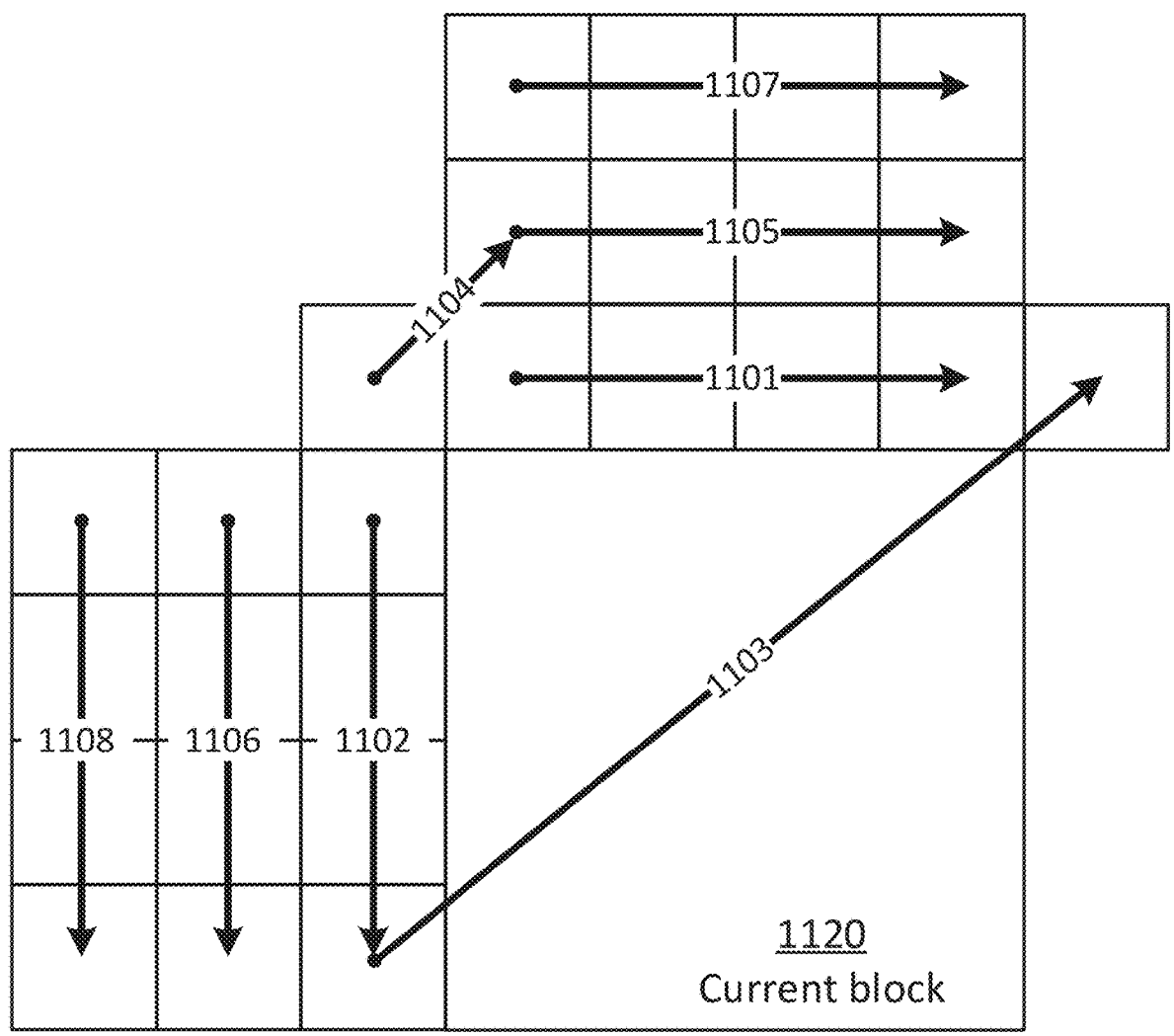
FIG. 11 shows an example of spatial neighboring motion for motion vector prediction.

As shown in FIG. 11, sSpatial motion vector (MV) predictors may be derived from spatial neighboring blocks of a current block (1120). The spatial neighboring blocks of the current block may include: i) adjacent spatial neighboring blocks (indicated by 1101 and 1102) which are direct neighbors of the current block to the top and left sides, and ii) non-adjacent spatial neighboring blocks (indicated by e.g., 1106, 1108, 1105, 1107, 1104 or 1103), which are close to, but not directly adjacent to the current block. An example of a set of spatial neighboring blocks for a luma block is illustrated in FIG. 11, wherein each spatial neighboring block is an 8×8 block.

In some implementations, the spatial neighboring blocks are examined to find one or more MVs that are associated with the same reference frame index as the current block. For the current block, the search order of spatial neighboring 8×8 luma blocks is as indicated by a sequential numbers 1101-1108 in FIG. 11, as below. 1. The top adjacent row is checked from left to right. 2. The left adjacent column is checked from top to bottom. 3. The top-right neighboring block is checked. 4. The top-left block neighboring block is checked. 5. The first top non-adjacent row is checked from left to right. 6. The first left non-adjacent column is checked from top to bottom. 7. The second top non-adjacent row is checked from left to right. 8. The second left non-adjacent column is checked from top to bottom.

In some implementations, the adjacent candidates (1011-1103) may be a group of MVPs firstly put into the MV predictor list before TMVP; and/or the non-adjacent (also known as outer candidates, i.e., candidates 1104-1108) may be put into the MV predictor list after the TMVP. All the SMVP candidates should have the same reference picture as the current block. That is, when the current block has single reference picture, the MVP candidate may have single reference picture and this reference picture is same as the reference picture of the current block, or with compound reference pictures (2 reference picture) and one of the reference pictures is same as the reference picture of the current block, this MVP candidate may be put into the MV predictor list. In some other implementations, when the current block has two reference pictures, only when the MVP candidate has two reference pictures, these two reference pictures are the same as the reference pictures of the current block. In some implementations, the outer lines 1105 and 1107 may be further removed from the non-adjacent candidates to reduce the line memory.

In some implementations, a reference motion vector candidate bank may be used. In some implementations, each buffer corresponds to a unique reference frame type, corresponding to a single or a pair of reference frames, covering single and compound inter modes respectively. All the buffers are the same size. When a new MV is added to a buffer that is full, an existing MV is evicted to make room for the new one. In some implementations, coding blocks can refer to the MV candidate bank to collect reference MV candidates, in addition to the ones obtained with the conventional reference MV list generation. After coding a superblock, the MV bank is updated with the MVs used by the coding blocks of the superblock. In some implementations, each tile has an independent MV reference bank that is utilized by all superblocks within the tile. At the beginning of encoding each tile, the corresponding bank is emptied. Thereafter, while coding each superblock within that tile, MVs from the bank may be used as MV reference candidates. At the end of encoding a superblock, the bank is updated.

Figure 12:
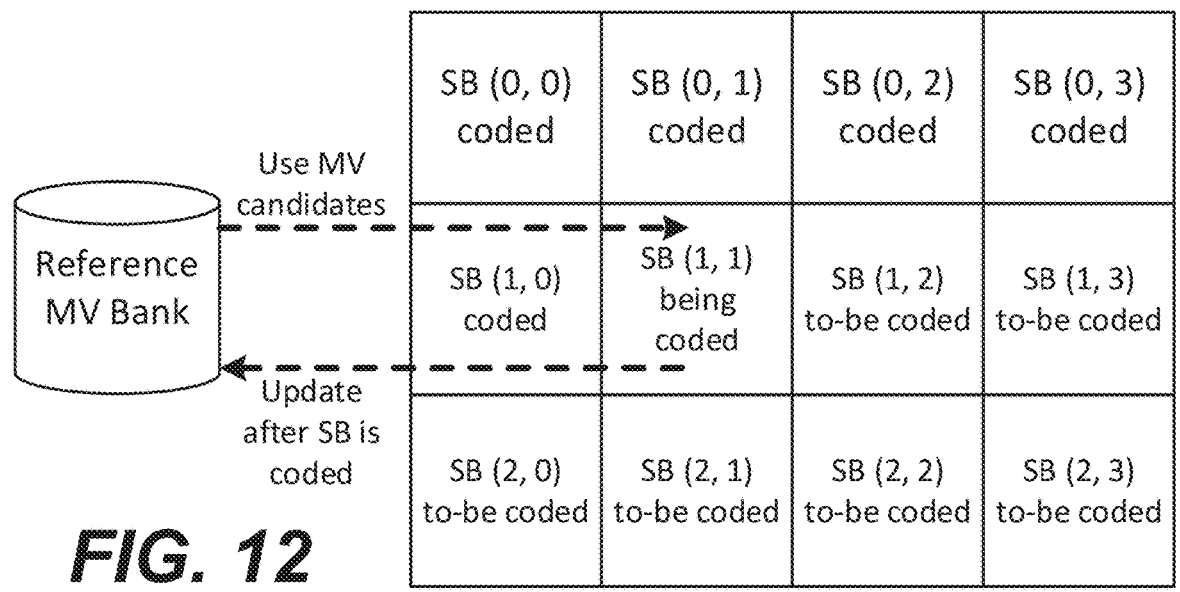
FIG. 12 shows an example of reference motion vector candidate bank updating process.

In some implementations, the bank updating process may be shown in FIG. 12. The bank updating process may be based on a superblock. That is, after one superblock is coded, the first (up to 64) candidate MVs used by each coding block inside the superblock may be added to the bank. During updating, the pruning process is also involved during the updating.

In some implementations, referring to bank referencing process, after the reference MV candidate scanning is done, when there are open slots in the candidate list, the encoder and/or decoder may reference the MV candidate bank (in the buffer with matching reference frame type) for additional MV candidates. Going from the end backwards to the start of the buffer, the MV in the bank buffer may be appended to the candidate list when it does not already exist in the list.

In some implementations, for an inter coding block, overlapped block motion compensation (OBMC) may be allowed when the following conditions are met: the current block uses single reference prediction, the width or height of the coding block is greater than or equal to eight, and at least one of the neighboring blocks is inter coded. In some implementations, when OBMC is applied to the current block, the initial inter prediction samples are first generated by using the MV associated with the current block. Then, the inter prediction samples for the current block and the inter prediction samples derived using MVs from the top and left neighboring blocks are blended to generate the final prediction samples. The maximum number of neighboring MVs may be limited by the size of the current block; up to four MVs from each of the top and left neighboring blocks may be used in the OBMC process for the current block. For each of the top and left neighboring blocks, when more than four MVs have been identified, OBMC is only applied for prediction samples associated with the first four MVs.

Figure 13:
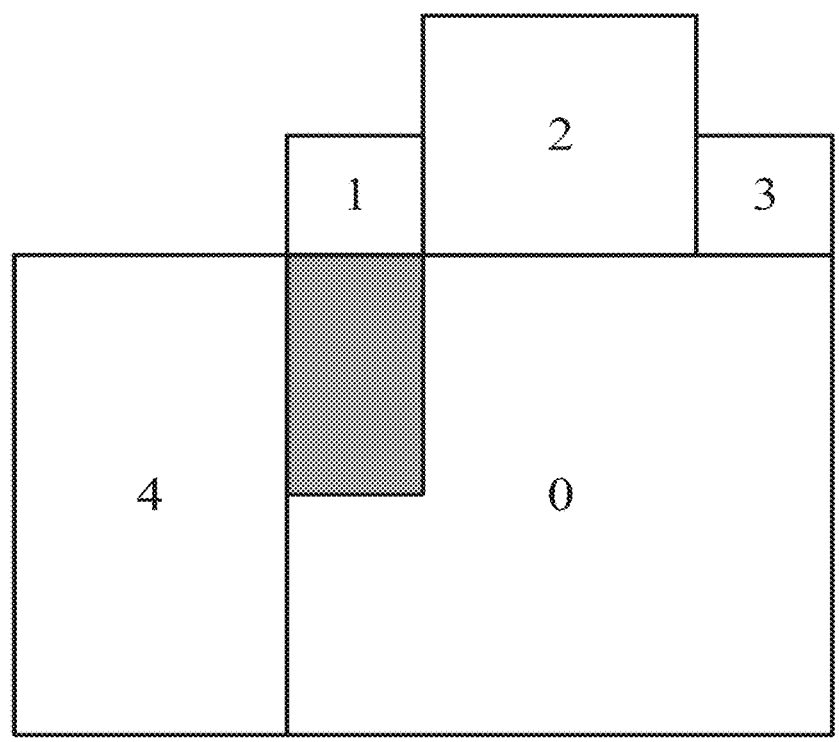
FIG. 13 shows an example of neighboring blocks used in overlapped block motion compensation process.

FIG. 13 shows a non-limiting example of the processing order of neighboring blocks, wherein the values (0-4) marked in each block indicate the processing order of the MVs of the current and neighboring blocks. Specifically, the MV of the current block is first applied to generate inter prediction samples $p_0(x, y)$. Then, the MV of block 1 is applied to generate prediction samples $p_1(x, y)$. After that, the prediction samples in the overlapping area between block 0 and block 1 (marked in grey in FIG. 13) are given as a weighted average of $p_0(x, y)$ and $p_1(x, y)$. The MVs of blocks 2, 3, and 4 are further applied and blended in the same way. The weights $w(x, y)$ are generated using a raised sine function, as follows:

$$w(x, y) = 0.5 \cdot \sin\left(\pi \cdot \frac{y + 0.5}{H}\right) + 0.5,$$

where y=0, 1, . . . and H/2−1, and H is the current block height.

In some other example implementations, a warped motion mode may be used. Conventional motion compensation may assume a translational motion model between the reference and target block, and the warped motion may utilize an affine model, which may be represented by the following equation:

$$\begin{bmatrix} x' \\ y' \end{bmatrix} = \begin{bmatrix} a_1 & a_2 & a_3 \\ b_1 & b_2 & b_3 \end{bmatrix} \cdot \begin{bmatrix} x \\ y \\ 1 \end{bmatrix}$$

where [x, y] are the coordinates of the original pixel and [x', y'] are the warped coordinates of the reference block. It can be seen from the above equation that up to six parameters are needed to specify the warped motion: $a_3$ and $b_3$ specify a conventional translational MV; $a_1$ and $b_2$ specify the scaling along the MV; and $a_2$ and $b_1$ specify the rotation.

In some implementations, when one block is coded as BAWP mode, one flag may be signaled to indicate whether explicit or implicit signaling for BAWP scaling factors is used. When implicit signaling of BAWP scaling factors is employed, the BAWP scaling factor and offset value may be derived from the linear equation based on the template of current block and the template of the reference block pointed by the motion vector of current block. When explicit signaling of BAWP scaling factors is employed, another flag is signaled to indicate which scaling factor is used for current block and the offset is derived as zero. The supported scaling factors may be stored in one or multiple pre-defined look-up tables, and the index of the scaling factors in the look-up table is signaled into the bitstream and parsed at the decoder side.

In the present disclosure, look-up tables may also be referred as lists, and scaling factor look-up tables may be referred as lists of scaling factor candidates. In the present disclosure, a NEARMV mode may be referred as a coding mode that inherits neighboring block motion vectors; and/or a NEWMV mode may be referred as a coding mode that signals motion vector difference relative to a motion vector predictor selected from a spatially or temporally neighboring block; and/or an AMVDNEWMV mode may be referred as a coding mode that signals motion vector difference relative to a motion vector predictor selected from a spatially or temporally neighboring block and the precision of the motion vector is implicitly determined based on the magnitude of the motion vector.

In some implementations, there are some issues or problems associated with BAWP method, particularly it may be only applicable when there is only one motion vector for a current block, which may be addressed or improved to increase coding/decoding efficiency. For a non-limiting example, the current block may have more than one motion vectors, and under such circumstances, there may be room for further improvement on the using BAWP or other method to enhance the coding/decoding efficiency. The present disclosure describes various embodiments for providing extensions to BAWP, addressing at least one of the issues or problems discussed above, improving coding/decoding efficiency, and advancing the video codec technology. Various embodiment may provide more accurate prediction by using multiple reference blocks for prediction; and/or may save signaling by deriving model for motion vector.

Various embodiments and/or implementations described in the present disclosure may be performed separately or combined in any order. Further, each of the methods (or embodiments), encoder, and decoder may be implemented by processing circuitry (e.g., one or more processors or one or more integrated circuits). The one or more processors execute a program that is stored in a non-transitory computer-readable medium. In the present disclosure, the term block may be interpreted as a prediction block, a coding block, or a coding unit (CU). In the present disclosure, a direction of a reference frame may be determined by whether the reference frame is prior to current frame in display order or after current frame in display order.

Figure 14:
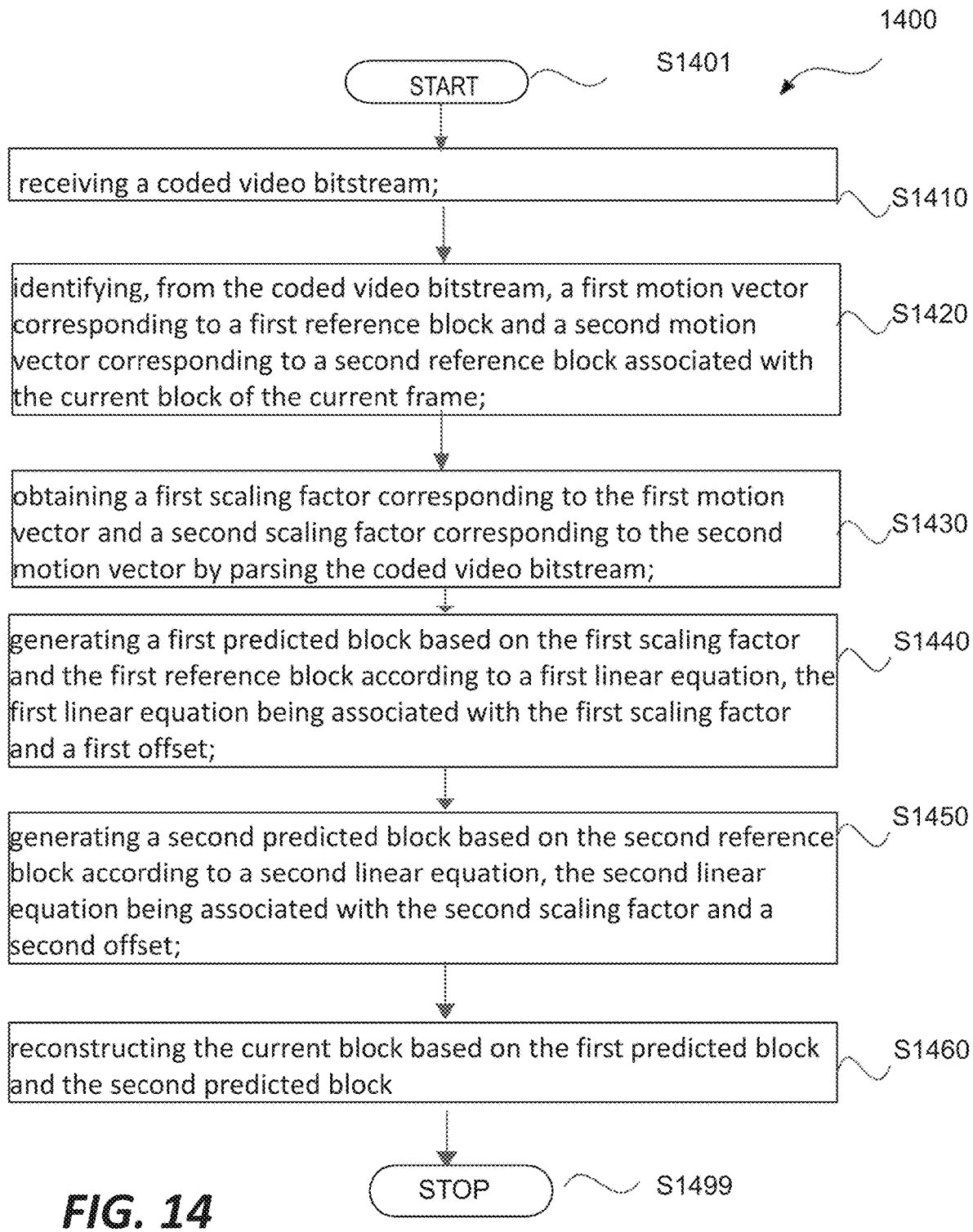
FIG. 14 shows an example logic flow for a method in the present disclosure.

FIG. 14 shows a flow chart 1400 of an exemplary method following the principles underlying the implementations above for decoding a current block of a current frame in a coded video bitstream, which may be preformed by an electronic device (e.g., an decoder). The exemplary decoding method flow starts at 1401, and may include a portion or all of the following steps: S1410, receiving a coded video bitstream; S1420, identifying, from the coded video bitstream, a first motion vector corresponding to a first reference block and a second motion vector corresponding to a second reference block associated with the current block of the current frame; S1430, obtaining a first scaling factor corresponding to the first motion vector and a second scaling factor corresponding to the second motion vector by parsing the coded video bitstream; S1440, generating a first predicted block based on the first scaling factor and the first reference block according to a first linear equation, the first linear equation being associated with the first scaling factor and a first offset; S1450, generating a second predicted block based on the second reference block according to a second linear equation, the second linear equation being associated with the second scaling factor and a second offset; and/or S1460 reconstructing the current block based on the first predicted block and the second predicted block. The example method stops at S1499.

Various embodiments include another exemplary method following the principles underlying the implementations above for decoding a current block of a current frame in a coded video bitstream, which may be preformed by an electronic device (e.g., an decoder). The exemplary decoding method may include a portion or all of the following steps: receiving a coded video bitstream; identifying, based on the coded video bitstream, a plurality of motion vectors for the current block, the plurality of motion vectors comprising a first motion vector corresponding to a first reference block and a second motion vector corresponding to a second reference block; identifying, based on the coded video bitstream, a first scaling factor corresponding to the first motion vector; generating a first predicted block based on the first scaling factor and the first reference block according to a first linear equation; generating a second predicted block based on the second reference block according to a second equation; and/or reconstructing the current block based on the first predicted block and the second predicted block.

In any portion or combination of the implementations above, the method may further include obtaining, from a syntax element signaled in the coded bitstream, the first scaling factor and the second scaling factor; and/or deriving, based on the coded bitstream, the first offset and the second offset based on the first linear equation and the second linear equation respectively.

In any portion or combination of the implementations above, the second equation is a second linear equation.

In any portion or combination of the implementations above, the method may further include extracting, by the device based on the coded video bitstream, a second scaling factor corresponding to the second motion vector; deriving, by the device, a first offset for the first linear equation based on a current template of the current block and a first reference template of the first reference block; and/or deriving, by the device, a second offset for the second linear equation based on the current template of the current block and a second reference template of the second reference block.

In any portion or combination of the implementations above, the identifying, based on the coded video bitstream, the first scaling factor corresponding to the first motion vector comprises: deriving, by the device, a first derived scaling factor and a first offset for the first linear equation based on a current template of the current block and a first reference template of the first reference block; identifying, by the device based on the coded video bitstream, a first scaling factor adjustment; and/or generate, by the device, the first scaling factor based on the first derived scaling factor and the first scaling factor adjustment.

In any portion or combination of the implementations above, a plurality of supported scaling factor corresponding to the plurality of motion vectors are symmetrically distributed with respect to a predefined value.

In any portion or combination of the implementations above, the first scaling factor corresponding to the first motion vector is signaled in the coded video bitstream; and/or a second scaling factor corresponding to the second motion vector is a default predefined value or is derived based on a current template of the current block and a second reference template of the second reference block.

In any portion or combination of the implementations above, a first picture order count (POC) distance between a first reference frame of the first reference block and the current frame is larger than a second POC distance between a second reference frame of the second reference block and the current frame; a first error cost for the first motion vector is larger than a second error cost for the second motion vector; and/or at least one syntax indicates to signal the first scaling factor for the first motion vector.

In any portion or combination of the implementations above, the first error cost comprises a sum of absolute differences (SAD) or a sum of squared errors (SSE) between a template of the current block and a predicted template of the current block from a first template of the first reference block using derived scaling factor and offset; and/or the second error cost comprises a sum of absolute differences (SAD) or a sum of squared errors (SSE) between the template of the current block and the predicted template of the current block from a second template of the second reference block using derived scaling factor and offset.

In any portion or combination of the implementations above, the reconstructing the current block based on the first predicted block and the second predicted block comprises: performing weighted average on the first predicted block and the second predicted block to obtain the current block.

In any portion or combination of the implementations above, the second equation corresponding to a prediction model other than a linear model; and/or the reconstructing the current block based on the first predicted block and the second predicted block comprises: performing weighted average on the first predicted block and the second predicted block to obtain the current block In any portion or combination of the implementations above, the first motion vector is signaled to use the first linear equation; and/or a first error cost for the first motion vector is larger than a second error cost for the second motion vector.

In any portion or combination of the implementations above, the first error cost comprises a sum of absolute differences (SAD) or a sum of squared errors (SSE) between a template of the current block and a predicted template of the current block from a first template of the first reference block using derived scaling factor and offset; and/or the second error cost comprises a sum of absolute differences (SAD) or a sum of squared errors (SSE) between the template of the current block and the predicted template of the current block from a second template of the second reference block using derived scaling factor and offset.

In any portion or combination of the implementations above, the method may further include extracting, by the device based on the coded video bitstream, a flag indicating which of the following models for the second equation: a translational motion model, a warped motion model, or an overlapped block motion compensation (OBMC) model.

In any portion or combination of the implementations above, the second equation is a second linear equation; and/or the first linear equation and the second linear equation share at least one of the following: a same scaling factor, or a same offset.

In any portion or combination of the implementations above, the second equation is a second linear equation; and/or the first linear equation and the second linear equation have different scaling factors and share a same offset.

In various embodiments in the present disclosure, when a current block includes more than one motion vectors, and each motion vector is pointing to one block in the reference frame, multiple linear models may be used to describe the linear relationship between the current block and its multiple reference blocks in a BAWP/LIC mode. For each linear model, a linear function includes a scaling factor a and an offset β, wherein the scaling factor α and/or the offset β may be derived from a template of the current block and a template of each of reference blocks, or the scaling factor α and/or the offset β may be signaled into the bitstream by an encoder and then parsed by a decoder to reconstruct the predicted block to obtain the current block. Each of the reference block is specified by the motion vector associated with its reference frame.

In various embodiments, when a current block consists of more than one motion vectors and each motion vector is pointing to one block in the reference block, at least one linear model is employed to describe the linear relationship between the current block and one of its reference blocks.

In some implementations, when a current block includes more than one motion vectors and each motion vector is pointing to one block in the reference frame, one linear model is employed for each motion vector respectively. For a non-limiting example, when the current block has two motion vectors, two linear models are employed for these two motion vectors separately.

In some implementations, the scaling factors or indices of the scaling factors are signaled for each model separately, and/or the offset for each model is derived based on the linear model equation.

In some implementations, the supported values of adjustments (or delta values) for the scaling factors are stored in one predefined look-up table, and the index of the adjustment of the scaling factors are signaled for each model separately, and the offset for each model is derived based on the linear model equation separately. The adjustment (or delta value) for the scaling factors is based on the derived scaling factors between a template of the current block and a template of the reference block pointed by the motion vector.

In some implementations, the supported scaling factors or the adjustment of the scaling factors are symmetrically distributed around one threshold value (TH), and for non-limiting examples, the TH is equal to 0 or 1.

In some implementations, a portion of the scaling factors is signaled, and another portion of the scaling factors is not signed. The not-signalled portion of scaling factors may be derived based on a template of the current block and a template of the reference block pointed by the motion vector, or may be equal to a default value. For a non-limiting example, when the current block has two motion vectors, two linear models are employed for these two motion vectors separately; the scaling factor for one linear model is signaled and the scaling factor for the other linear model takes a default value or is derived based on the template of current block and the template of the reference block pointed by the motion vector. In some implementations, the default value may be 1.

In some implementations, the decision on which scaling factor is signaled may depend on the SAD/SSE cost between the template of current block and the predicted template of current block from the template of the reference block using the derived scaling factor and offset. For a non-limiting example, the one with larger SAD/SSE cost may be signaled, and the one with smaller SAD/SSE may be derived or take a default value.

In some implementations, the decision on which scaling factor is signaled may depend on the POC of the reference blocks with respect to the current block. For a non-limiting example, the one with larger POC may be signaled, and the one with smaller POC may be derived or take a default value.

In some implementations, one or more syntaxes may be signaled by the encoder and/or may be parsed by the decoder to indicate which scaling factor is selected for signaling or being derived.

In various embodiments, when a current block has more than one motion vector, with each motion vector pointing to a different block in the reference frame, one linear model may be employed for one of the motion vectors to generate the prediction samples. Other mode other than linear model (e.g., translational motion, warped motion, or OBMC) may be employed for the other motion vectors to generate the prediction samples. The two or more prediction blocks are then weighted and averaged to generate the multi-predicted (e.g., bi-predicted for two motion vectors) prediction samples.

In some implementations, the decision on which motion vector to use with the linear model may be signaled in the bitstream by the encoder and parsed at the decoder side.

In some implementations, the decision on which motion vector to use with linear model may be implicitly derived based on the coded information of current block and/or neighboring blocks. In one example, the decision may depend on the SAD/SSE cost between the template of current block and the predicted template of current block from the template of the reference block using the derived scaling factor and offset. For a non-limiting example, the one with smaller SAD/SSE cost may use the linear model, and the one with larger SAD/SSE may use the model other than a linear model.

In some implementations, when the decision is made not to use linear model for one motion vector of current block, another flag may be signaled to indicate which of the following models are used for this motion vector: translational model, warped model, or OBMC.

In various embodiments, when the current block consists of more than one motion vectors and each motion vector is pointing to one block in the reference frame, one linear model is employed for each motion vector respectively. In some implementations, the linear model associated with multiple motion vectors may share the same value for part of the linear model parameters. For a non-limiting example, when the current block has two motion vectors, two linear models are employed for these two motion vectors separately, and these two linear models may have different scaling factor α but the same offset β.

Various embodiments in the present disclosure may include methods for encoding a current block into a video bitstream, which are performed by an encoder, including inverse processes as any portion or all of the processes that are described for the decoder. Various embodiments in the present disclosure may include methods for encoding a current block for streaming video, which are performed by one or more electronic device (e.g., streaming media player), including any portion or all of the processes for the decoder and/or any portion or all of the processes that are described for an encoder.

Operations above may be combined or arranged in any amount or order, as desired. Two or more of the steps and/or operations may be performed in parallel. Embodiments and implementations in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium. Embodiments in the disclosure may be applied to a luma block or a chroma block. The term block may be interpreted as a prediction block, a coding block, or a coding unit, i.e. CU. The term block here may also be used to refer to the transform block. In the following items, when saying block size, it may refer to either the block width or height, or maximum value of width and height, or minimum of width and height, or area size (width*height), or aspect ratio (width: height, or height: width) of the block.

The techniques described above, can be implemented as computer software using computer-readable instructions and physically stored in one or more computer-readable media. For example, FIG. 15 shows a computer system (1800) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 15:
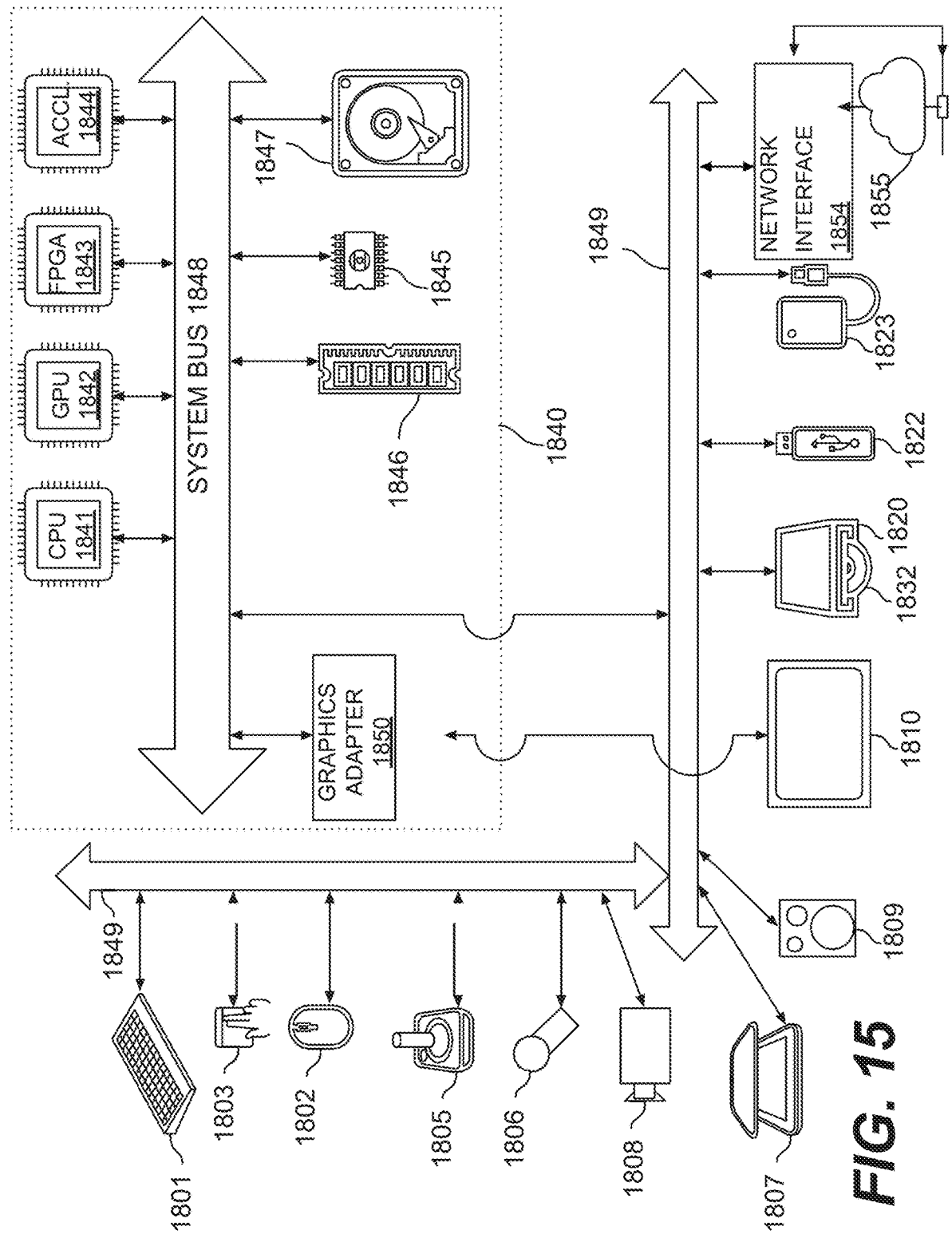
FIG. 15 shows a schematic illustration of a computer system in accordance with example embodiments of this disclosure.

The components shown in FIG. 15 for computer system (1800) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1800).

Computer system (1800) may include certain human interface input devices. Input human interface devices may include one or more of (only one of each depicted): keyboard (1801), mouse (1802), trackpad (1803), touch screen (1810), data-glove (not shown), joystick (1805), microphone (1806), scanner (1807), camera (1808).

Computer system (1800) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1810), data-glove (not shown), or joystick (1805), but there can also be tactile feedback devices that do not serve as input devices), audio output devices (such as: speakers (1809), headphones (not depicted)), visual output devices (such as screens (1810) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1800) can also include human accessible storage devices and their associated media such as optical media including CD/DVD ROM/RW (1820) with CD/DVD or the like media (1821), thumb-drive (1822), removable hard drive or solid state drive (1823), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1800) can also include an interface (1854) to one or more communication networks (1855). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CAN bus, and so forth.

Aforementioned human interface devices, human-accessible storage devices, and network interfaces can be attached to a core (1840) of the computer system (1800).

The core (1840) can include one or more Central Processing Units (CPU) (1841), Graphics Processing Units (GPU) (1842), specialized programmable processing units in the form of Field Programmable Gate Areas (FPGA) (1843), hardware accelerators for certain tasks (1844), graphics adapters (1850), and so forth. These devices, along with Read-only memory (ROM) (1845), Random-access memory (1846), internal mass storage such as internal non-user accessible hard drives, SSDs, and the like (1847), may be connected through a system bus (1848). In some computer systems, the system bus (1848) can be accessible in the form of one or more physical plugs to enable extensions by additional CPUs, GPU, and the like. The peripheral devices can be attached either directly to the core's system bus (1848), or through a peripheral bus (1849). In an example, the screen (1810) can be connected to the graphics adapter (1850). Architectures for a peripheral bus include PCI, USB, and the like.

The computer readable media can have computer code thereon for performing various computer-implemented operations. The media and computer code can be those specially designed and constructed for the purposes of the present disclosure, or they can be of the kind well known and available to those having skill in the computer software arts.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for decoding a current block of a current frame in a coded video bitstream, the method comprising:
   receiving, by a device comprising a memory storing instructions and a processor in communication with the memory, the coded video bitstream;
   identifying, by the device from the coded video bitstream, a first motion vector corresponding to a first reference block and a second motion vector corresponding to a second reference block associated with the current block of the current frame;
   obtaining, by the device, a first scaling factor corresponding to the first motion vector and a second scaling factor corresponding to the second motion vector by parsing the coded video bitstream;
   generating, by the device, a first predicted block based on the first scaling factor and the first reference block according to a first linear equation, the first linear equation being associated with the first scaling factor and a first offset;
   generating, by the device, a second predicted block based on the second reference block according to a second equation, the second equation being associated with the second scaling factor and a second offset; and
   reconstructing, by the device, the current block based on the first predicted block and the second predicted block.

2. The method according to claim 1, further comprising:
   obtaining, from a syntax element signaled in the coded video bitstream, the first scaling factor and the second scaling factor; and
   deriving, based on the coded bitstream, the first offset and the second offset based on the first linear equation and the second equation respectively.

3. The method according to claim 1, further comprising:
   extracting, by the device based on the coded video bitstream, the second scaling factor corresponding to the second motion vector;
   deriving, by the device, the first offset for the first linear equation based on a current template of the current block and a first reference template of the first reference block; and
   deriving, by the device, the second offset for the second equation based on the current template of the current block and a second reference template of the second reference block.

4. The method according to claim 1, wherein the obtaining the first scaling factor corresponding to the first motion vector comprises:
   deriving, by the device, a first derived scaling factor and the first offset for the first linear equation based on a current template of the current block and a first reference template of the first reference block;
   identifying, by the device based on the coded video bitstream, a first scaling factor adjustment; and
   generate, by the device, the first scaling factor based on the first derived scaling factor and the first scaling factor adjustment.

5. The method according to claim 1, wherein:
   a plurality of supported scaling factor corresponding to a plurality of motion vectors are symmetrically distributed with respect to a predefined value.

6. The method according to claim 1, wherein:
   the first scaling factor corresponding to the first motion vector is signaled in the coded video bitstream; and
   the second scaling factor corresponding to the second motion vector is a default predefined value or is derived based on a current template of the current block and a second reference template of the second reference block.

7. The method according to claim 6, wherein:
   a first picture order count (POC) distance between a first reference frame of the first reference block and the current frame is larger than a second POC distance between a second reference frame of the second reference block and the current frame;
   a first error cost for the first motion vector is larger than a second error cost for the second motion vector; or at least one syntax indicates to signal the first scaling factor for the first motion vector.

8. The method according to claim 7, wherein:
the first error cost comprises a sum of absolute differences (SAD) or a sum of squared errors (SSE) between a template of the current block and a predicted template of the current block from a first template of the first reference block using derived scaling factor and offset; and
the second error cost comprises a sum of absolute differences (SAD) or a sum of squared errors (SSE) between the template of the current block and the predicted template of the current block from a second template of the second reference block using derived scaling factor and offset.

9. The method according to claim 1, wherein the reconstructing the current block based on the first predicted block and the second predicted block comprises:
performing weighted average on the first predicted block and the second predicted block to obtain the current block.

10. The method according to claim 1, wherein:
the second equation corresponding to a prediction model other than a linear model; and
the reconstructing the current block based on the first predicted block and the second predicted block comprises:
performing weighted average on the first predicted block and the second predicted block to obtain the current block.

11. The method according to claim 10, wherein:
the first motion vector is signaled to use the first linear equation; or
a first error cost for the first motion vector is larger than a second error cost for the second motion vector.

12. The method according to claim 11, wherein:
the first error cost comprises a sum of absolute differences (SAD) or a sum of squared errors (SSE) between a template of the current block and a predicted template of the current block from a first template of the first reference block using derived scaling factor and offset; and
the second error cost comprises a sum of absolute differences (SAD) or a sum of squared errors (SSE) between the template of the current block and the predicted template of the current block from a second template of the second reference block using derived scaling factor and offset.

13. The method according to claim 10, further comprising:
extracting, by the device based on the coded video bitstream, a flag indicating which of the following models for the second equation: a translational motion model, a warped motion model, or an overlapped block motion compensation (OBMC) model.

14. The method according to claim 1, wherein:
the second equation is a second linear equation; and
the first linear equation and the second linear equation share at least one of the following: a same scaling factor, or a same offset.

15. The method according to claim 1, wherein:
the second equation is a second linear equation; and
the first linear equation and the second linear equation have different scaling factors and share a same offset.

16. An apparatus for decoding a current block of a current frame in a coded video bitstream, the apparatus comprising:
a memory storing instructions; and
a processor in communication with the memory, wherein, when the processor executes the instructions, the processor is configured to cause the apparatus to:
receive the coded video bitstream;
identify, from the coded video bitstream, a first motion vector corresponding to a first reference block and a second motion vector corresponding to a second reference block associated with the current block of the current frame;
obtain a first scaling factor corresponding to the first motion vector and a second scaling factor corresponding to the second motion vector by parsing the coded video bitstream;
generate a first predicted block based on the first scaling factor and the first reference block according to a first linear equation, the first linear equation being associated with the first scaling factor and a first offset;
generate a second predicted block based on the second reference block according to a second linear equation, the second linear equation being associated with the second scaling factor and a second offset; and
reconstruct the current block based on the first predicted block and the second predicted block.

17. The apparatus according to claim 16, wherein, when the processor executes the instructions, the processor is configured to further cause the apparatus to:
obtain, from a syntax element signaled in the coded video bitstream, the first scaling factor and the second scaling factor; and
derive, based on the coded bitstream, the first offset and the second offset based on the first linear equation and the second linear equation respectively.

18. The apparatus according to claim 16, wherein, when the processor executes the instructions, the processor is configured to further cause the apparatus to:
extract, based on the coded video bitstream, the second scaling factor corresponding to the second motion vector;
deriving the first offset for the first linear equation based on a current template of the current block and a first reference template of the first reference block; and
deriving the second offset for the second linear equation based on the current template of the current block and a second reference template of the second reference block.

19. The apparatus according to claim 16, wherein:
the first scaling factor corresponding to the first motion vector is signaled in the coded video bitstream; and
the second scaling factor corresponding to the second motion vector is a default predefined value or is derived based on a current template of the current block and a second reference template of the second reference block.

20. A non-transitory computer readable storage medium storing instructions, wherein, when the instructions are executed by a processor, the instructions are configured to cause the processor to:
receive a coded video bitstream,
identify, from the coded video bitstream, a first motion vector corresponding to a first reference block and a second motion vector corresponding to a second reference block associated with a current block of a current frame;
obtain a first scaling factor corresponding to the first motion vector and a second scaling factor corresponding to the second motion vector by parsing the coded video bitstream;
generate a first predicted block based on the first scaling factor and the first reference block according to a first linear equation, the first linear equation being associated with the first scaling factor and a first offset;
generate a second predicted block based on the second reference block according to a second linear equation, the second linear equation being associated with the second scaling factor and a second offset; and
reconstruct the current block based on the first predicted block and the second predicted block.

* * * * *